United States Patent
Yang et al.

(10) Patent No.: US 8,700,369 B2
(45) Date of Patent: Apr. 15, 2014

(54) METHOD AND APPARATUS FOR ESTIMATING ERROR IN MULTI-AXIS CONTROLLED MACHINE

(75) Inventors: Seung-Han Yang, Daegu (KR); Dong-Mok Lee, Daegu (KR); Sung-Hwan Kweon, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 684 days.

(21) Appl. No.: 12/769,178

(22) Filed: Apr. 28, 2010

(65) Prior Publication Data

US 2011/0218780 A1    Sep. 8, 2011

(30) Foreign Application Priority Data

Mar. 2, 2010 (KR) .................. 10-2010-0018364

(51) Int. Cl.
   *G06G 7/48* (2006.01)
   *G06F 17/16* (2006.01)
   *G01C 17/38* (2006.01)
   *G05B 13/04* (2006.01)
   *G06F 19/00* (2011.01)

(52) U.S. Cl.
   USPC ........ 703/7; 703/2; 700/28; 700/29; 700/192; 700/173; 702/95

(58) Field of Classification Search
   USPC ........ 703/7, 2; 700/15, 30, 31, 57–58, 61, 64, 700/78, 159, 170, 28, 29, 192, 173; 702/95, 702/113
   See application file for complete search history.

(56) References Cited

U.S. PATENT DOCUMENTS

| | | | | |
|---|---|---|---|---|
| 5,001,842 A | * | 3/1991 | Wright et al. | 33/702 |
| 5,396,160 A | * | 3/1995 | Chen | 318/573 |
| 5,434,803 A | * | 7/1995 | Yoshida | 702/168 |
| 5,442,572 A | * | 8/1995 | Kiridena et al. | 382/141 |
| 5,815,400 A | * | 9/1998 | Hirai et al. | 700/173 |
| 6,178,389 B1 | * | 1/2001 | Sola et al. | 702/152 |
| 6,198,246 B1 | * | 3/2001 | Yutkowitz | 318/561 |

(Continued)

FOREIGN PATENT DOCUMENTS

JP   2006065716 A   *   3/2006

OTHER PUBLICATIONS

A gerenalized Geometric Error Model for MultiAxis Machines K.F. Eman et al Annals of the CIRP vol. 36/1/1987, p. 253-256.*

(Continued)

*Primary Examiner* — Akash Saxena
(74) *Attorney, Agent, or Firm* — Reinhart Boerner Van Deuren P.C.

(57) ABSTRACT

A method and apparatus for estimating error in a multi-axis controlled machine is applicable to any type of machine configuration in order to estimate and confirm in advance the final position and the posture of the machine, which are produced when geometric errors of the machine are synthesized. The method includes defining the structure of the multi-axis controlled machine subjected to error estimation; and defining parameters, which represent behaviors of drive axes having geometric error and relationships between the drive axes according to the defined structure of the multi-axis controlled machine, adding the defined parameters by applying the parameters to a generalized error synthesis model, and generating an error synthesis model of the multi-axis controlled machine by applying a result of parametric modeling in response to a result of the adding.

11 Claims, 18 Drawing Sheets

(56) References Cited

U.S. PATENT DOCUMENTS

| | | | |
|---|---|---|---|
| 6,233,495 B1* | 5/2001 | Chen | 700/29 |
| 6,259,221 B1* | 7/2001 | Yutkowitz | 318/561 |
| 6,325,578 B1* | 12/2001 | Szuba et al. | 409/238 |
| 6,456,897 B1* | 9/2002 | Papiernik et al. | 700/194 |
| 6,535,794 B1* | 3/2003 | Raab | 700/262 |
| 6,594,538 B1* | 7/2003 | Graham et al. | 700/110 |
| 6,968,256 B2* | 11/2005 | Graham et al. | 700/186 |
| 7,050,883 B2* | 5/2006 | Cho et al. | 703/2 |
| 7,111,783 B2* | 9/2006 | Xi et al. | 235/437 |
| 7,209,799 B2* | 4/2007 | Agapiou et al. | 700/177 |
| 7,245,982 B2* | 7/2007 | Morfino | 700/174 |
| RE39,907 E* | 11/2007 | Hong | 318/571 |
| 8,006,398 B2* | 8/2011 | McFarland et al. | 33/503 |
| 8,560,283 B2* | 10/2013 | Cheng et al. | 703/6 |
| 2002/0087233 A1* | 7/2002 | Raab | 700/262 |
| 2003/0200042 A1* | 10/2003 | Gan et al. | 702/105 |
| 2005/0005465 A1* | 1/2005 | Taylor et al. | 33/502 |
| 2005/0062738 A1* | 3/2005 | Handley et al. | 345/419 |
| 2005/0102118 A1* | 5/2005 | Grupp et al. | 702/150 |
| 2005/0166412 A1* | 8/2005 | Ogura et al. | 33/502 |
| 2005/0234586 A1* | 10/2005 | Agapiou et al. | 700/159 |
| 2005/0284937 A1* | 12/2005 | Xi et al. | 235/437 |
| 2006/0048364 A1* | 3/2006 | Zhang et al. | 29/407.08 |
| 2007/0278980 A1* | 12/2007 | Wilson | 318/573 |
| 2008/0238072 A1* | 10/2008 | Kofoed et al. | 280/778 |
| 2009/0024343 A1* | 1/2009 | Balsamo et al. | 702/95 |
| 2010/0101104 A1* | 4/2010 | Grzesiak et al. | 33/502 |
| 2010/0204814 A1* | 8/2010 | Neumaier et al. | 700/97 |
| 2010/0298961 A1* | 11/2010 | Frisken et al. | 700/103 |
| 2010/0299094 A1* | 11/2010 | Hsu | 702/95 |
| 2010/0302552 A1* | 12/2010 | Yang et al. | 356/614 |
| 2011/0040523 A1* | 2/2011 | Matsushita | 702/152 |
| 2011/0054821 A1* | 3/2011 | Merlot | 702/95 |
| 2011/0054835 A1* | 3/2011 | Takamasu et al. | 702/150 |
| 2011/0178782 A1* | 7/2011 | Yang et al. | 703/2 |
| 2011/0208496 A1* | 8/2011 | Bando et al. | 703/2 |
| 2011/0218780 A1* | 9/2011 | Yang et al. | 703/2 |
| 2011/0224958 A1* | 9/2011 | Yang et al. | 703/2 |
| 2012/0065769 A1* | 3/2012 | Knaupp et al. | 700/193 |
| 2012/0084989 A1* | 4/2012 | Pettersson et al. | 33/503 |

OTHER PUBLICATIONS

On-Line Error Compensation of Coordinate Measuring Machines, P. S. Huang et al, Int. J. Mach. Tools Manufact. vol. 35. No. 5. pp. 725-738. 1995 Elsevier Science Ltd.*

Construction of an error map of rotary axes on a five-axis machining center by static R-test, Soichi Ibaraki et al, International Journal of Machine Tools & Manufacture 51 (2011) 190-200.*

A general Method for Error Descriptoin of CMMs Using Polynomial Fitting Procedures J.W.M.C Teeuwsen et al, Annals of the CIRP vol. 38/1/1989 p. 505-510.*

* cited by examiner

| 1 | Distance | Error |
|---|---|---|
| 2 | 0 | -0.002 |
| 3 | 10 | -0.00197 |
| 4 | 20 | -0.00194 |
| 5 | 30 | -0.00191 |
| 6 | 40 | -0.00187 |
| 7 | 50 | -0.00184 |
| 8 | 60 | -0.00181 |
| 9 | 70 | -0.00177 |
| 10 | 80 | -0.00173 |
| 11 | 90 | -0.0017 |
| 12 | 100 | -0.00166 |

FIG. 15a

|   | A | B | C | D | E |
|---|---|---|---|---|---|
| 1 | x | y | z | a | c |
| 2 | -48.9461 | 1.393083 | 104.3536 | 17.96386 | -122.946 |
| 3 | -48.5594 | 1.926171 | 104.5317 | 18.10901 | -123.638 |
| 4 | -48.1672 | 2.458162 | 104.7078 | 18.253 | -124.327 |
| 5 | -47.7696 | 2.988862 | 104.8817 | 18.39581 | -125.014 |
| 6 | -47.3668 | 3.51808 | 105.0535 | 18.53743 | -125.698 |
| 7 | -46.9587 | 4.04563 | 105.2232 | 18.67785 | -126.379 |
| 8 | -46.5455 | 4.571331 | 105.3908 | 18.81704 | -127.058 |
| 9 | -46.1272 | 5.095006 | 105.5563 | 18.95499 | -127.734 |
| 10 | -45.704 | 5.616482 | 105.7196 | 19.0917 | -128.409 |
| 11 | -45.2758 | 6.135591 | 105.8808 | 19.22713 | -129.081 |
| 12 | -44.8429 | 6.652167 | 106.0399 | 19.36128 | -129.751 |
| 13 | -44.4051 | 7.166051 | 106.1969 | 19.49414 | -130.418 |
| 14 | -43.9627 | 7.677085 | 106.3518 | 19.62569 | -131.084 |
| 15 | -43.5157 | 8.185114 | 106.5045 | 19.75591 | -131.748 |
| 16 | -43.0641 | 8.68999 | 106.6551 | 19.88479 | -132.41 |
| 17 | -42.6081 | 9.191564 | 106.8036 | 20.01233 | -133.07 |
| 18 | -42.1476 | 9.689694 | 106.9499 | 20.1385 | -133.728 |
| 19 | -41.6828 | 10.18424 | 107.0942 | 20.26329 | -134.385 |
| 20 | -41.2137 | 10.67506 | 107.2363 | 20.38669 | -135.04 |
| 21 | -40.7404 | 11.16203 | 107.3763 | 20.50869 | -135.693 |
| 22 | -40.2629 | 11.645 | 107.5142 | 20.62927 | -136.345 |
| 23 | -39.7814 | 12.12386 | 107.6499 | 20.74842 | -136.996 |

FIG. 15b

Max. Norm of Error Vector = 0.208085(at 121th point)
Min. Norm of Error Vector = 0.118958(at 272th point)

METHOD AND APPARATUS FOR ESTIMATING ERROR IN MULTI-AXIS CONTROLLED MACHINE

CROSS REFERENCE TO RELATED APPLICATION

The present application claims priority from Korean Patent Application Number 10-2010-0018364 filed on Mar. 2, 2010, the entire contents of which application is incorporated herein for all purposes by this reference.

BACKGROUND OF THE INVENTION

1. Field of the Invention

The present invention relates to a method and apparatus for estimating error in a multi-axis controlled machine, and more particularly, applicable to any type of machine configurations in order to estimate and verify in advance the final position and posture of the machine affected by perplexedly interlinked geometric errors.

2. Description of Related Art

Multi-axis controlled machines are a type of mechanical apparatus that includes two or more drive axes. A multi-axis controlled machine can be a multi-axis machine tool that has a combination of a number of linear or rotary drive axes, such as a linear slide or a rotary or tilting table, a multi-axis articulated robot, a Coordinate Measuring Machine (CMM), or the like. FIG. 1 shows a five-axis machine tool as an example of a multi-axis controlled machine.

The multi-axis controlled machines have many geometrical errors, such as error of each drive axis and error between drive axes, which are perplexedly interlinked to each other, thereby resulting in the deviation of final posture (i.e., position and orientation) when the multi-axis controlled machine is driven. Various error synthesis models, as mathematical expressions, are derived depending on the structures and shapes of the multi-axis machines.

Meanwhile, in the stage of designing or fabricating multi-axis controlled machines, it is necessary to measure and evaluate geometric errors of the machines in order to verify the performance and compensate for the errors of the machines. Devices used to measure such errors generally include a laser interferometer, a ball bar, a capacitance sensor, an autocollimator, a Position-Sensitive Detector (PSD), and the like. In particular, a variety of measuring methods has been studied and developed for multi-axis controlled machines having rotary axes due to the difficulty involved in measurement.

In addition, in order to estimate the performance of the multi-axis controlled machines, it is necessary to evaluate the final error effects of a number of geometric errors. However, in the multi-axis controlled machines having different configurations, technologies that define the relationships between a number of geometric errors, such as the error of a drive axis and the error between drive axes, and derive final error effects have not been automated yet. Thus, complicated and difficult mathematical calculation has to be performed every time, according to the configuration of a multi-axis controlled machine. In addition, it becomes very difficult for engineers to directly evaluate the contribution of respective errors to the final posture error. In particular, the greater the number of drive axes, the more significant these problems are.

Therefore, conventional error estimation technologies, which are used in general industrial sites, can only measure and estimate a small number of errors of a single axis or a small number of axes using an error estimation device, or estimate the performance of processing the errors by measuring the final result obtained by directly processing the errors. In addition, the accuracy of estimation is low.

The information disclosed in this Background of the Invention section is only for the enhancement of understanding of the background of the invention and should not be taken as an acknowledgment or any form of suggestion that this information forms a prior art that would already be known to a person skilled in the art.

BRIEF SUMMARY OF THE INVENTION

Various aspects of the present invention provide a method and apparatus for estimating errors in a multi-axis controlled machine that is applicable to any type of machine configurations and can estimate and confirm posture error in a final result in advance, which is generated when geometric errors of the multi-axis controlled machine are combined, without direct processing or a change in position.

In an aspect of the present invention, the method for estimating error in a multi-axis controlled machine may include the processes of: defining the configuration of the multi-axis controlled machine subjected to error estimation; and defining parameters, which represent behaviors of drive axes having geometric error and relationships between the drive axes according to the defined structure of the multi-axis controlled machine, adding the defined parameters by applying the parameters to a generalized error synthesis model, and generating an error synthesis model of the multi-axis controlled machine by applying a result of parametric modeling in response to a result of the adding.

According to an exemplary embodiment of the invention, the process of defining the structure of the multi-axis controlled machine can define one or more selected axis from the group consisting of defining drive axes of the multi-axis controlled machine, a posture of a tool, offset distances between the drive axes, and a setting of squareness error.

According to an exemplary embodiment of the invention, the process of defining the drive axes of the multi-axis controlled machine can include the step of sequentially arranging the drive axes, which are oriented in forward and backward directions in a reference coordinate system of the multi-axis controlled machine.

According to an exemplary embodiment of the invention, the process of generating an error synthesis model can include the step of determining local coordinate systems each link of the multi-axis controlled machine; defining parameters, which represent the behaviors of the drive axes having geometric error and the relationships between the drive axes according to the defined structure of the multi-axis controlled machine; adding the defined parameters by applying the parameters to the generalized error synthesis model; performing parametric modeling on error measurement data, which are measured from the multi-axis controlled machine; and generating the error synthesis model of the multi-axis controlled machine by applying the result of the parametric modeling in response to the result of the adding.

According to an exemplary embodiment of the invention, the generalized error synthesis model is derived by selecting one or more from the group consisting of kinematic error modeling of linear and rotary axes; modeling one or more drive axes by arranging the drive axes in forward or backward direction with respect to a reference coordinate system; and exclusion higher order terms of errors in the kinematic error modeling, which includes arranging the drive axes.

According to an exemplary embodiment of the invention, the generalized error synthesis model can be expressed by formulas:

$$\tau_{N_I}^{N_F} = \left(\tau_O^{N_I}\right)^{-1} \tau_O^{N_F} = \left[\begin{array}{c|c} \text{Rotation} & \text{Translation} \\ \hline 0 \ 0 \ 0 & 1 \end{array}\right]$$

$$\text{Rotation} = \left(\prod_{i=1}^{N_I} A_i\right)^T \prod_{i=1}^{N_F} A_i + \sum_{i=1}^{N_F} \left(\prod_{j=1}^{N_I} A_j\right)^T \prod_{j=0}^{i-1} A_j(S_i + E_i) \prod_{j=1}^{N_F} A_j -$$

$$\sum_{i=1}^{N_I} \left(\prod_{j=1}^{N_I} A_j\right)^T (S_i + E_i) \left(\prod_{j=1}^{i-1} A_j\right) \prod_{j=1}^{N_F} A_j$$

$$\text{Translation} = -\sum_{i=1}^{N_I} \left(\sum_{j=1}^{N_I} A_j\right)^T (o_i + t_i + d_i) + \sum_{i=2}^{N_I} \left(\prod_{j=1}^{N_I} A_j\right)^T S_i \sum_{j=1}^{i-1} \left(\prod_{k=j}^{i-1} A_k\right)^T t_j +$$

$$\sum_{i=1}^{N_I} \left(\sum_{j=1}^{N_I} A_j\right)^T E_i \sum_{j=1}^{i} \left(\prod_{k=j}^{i-1} A_k\right)^T t_j + \sum_{i=1}^{N_I} \left(\prod_{j=1}^{N_I} A_j\right)^T (S_i + E_i) \sum_{j=1}^{i} \left(\prod_{k=j}^{i-1} A_k\right)^T o_j +$$

$$\sum_{i=1}^{N_F} \left(\sum_{j=1}^{N_I} A_j\right)^T \prod_{j=1}^{i-1} A_j (o_i + t_i + d_i) + \sum_{i=1}^{N_I} \left(\prod_{j=1}^{N_I} A_j\right)^T \prod_{j=1}^{i-1} A_j S_i \sum_{j=1}^{N_F j-1} \prod_{k=i-1} A_k t_j +$$

$$\sum_{i=1}^{N_F-1} \left(\prod_{j=1}^{N_I} A_j\right)^T \prod_{j=0}^{i-1} A_j E_i \sum_{j=i+1}^{N_F} \prod_{j=1}^{j-1} A_k t_j +$$

$$\sum_{i=1}^{N_F-1} \left(\prod_{j=1}^{N_I} A_j\right)^T \prod_{j=0}^{i-1} A_j (S_i + E_i) \sum_{j=i+1}^{N_F} \prod_{k=i}^{j-1} A_k o_j -$$

$$\left(\sum_{i=1}^{N_I} \left(\prod_{j=1}^{N_I} A_i\right)^T (S_i + E_i) \left(\prod_{j=0}^{i-1} A_j\right)^T \right) \left(\sum_{i=1}^{N_F-1} \prod_{j=0}^{i-1} A_j (o_i + t_i)\right)$$

According to an exemplary embodiment of the invention, the method may further include processes of: creating a virtual coordinate of a point, which includes error of a designated shape to be processed or at a position to be confirmed, using the error synthesis model; and generating an error map, which visually expresses the created imaginary point.

According to an exemplary embodiment of the invention, the process of creating a virtual coordinate can include the steps of: determining the designated shape to be processed and the position to be confirmed; generating a tool path for the designated shape to be processed or the position to be confirmed; generating or inputting a motion parameter about each of the drive axes of the multi-axis controlled machine along the tool path of the multi-axis controlled machine; and creating a virtual coordinate having error for each of points in the tool path using the error synthesis model.

According to an exemplary embodiment of the invention, the designated shape to be processed can be a frustum of a cone or a hemisphere.

In an aspect of the present invention, the apparatus for estimating error in a multi-axis controlled machine may include a mechanistic structure definition module for defining a mechanistic structure subjected to error estimation; an error synthesis module for defining parameters, which represent behaviors of drive axes having geometric error and relationships between the drive axes according to the defined structure of the multi-axis controlled machine, adding the defined parameters by applying the parameters to a generalized error synthesis model, and generating an error synthesis model of the multi-axis controlled machine by applying a result of parametric modeling in response to a result of the adding; and an error mapping module for creating a virtual coordinate, which includes error of a designated shape to be processed or at a position to be confirmed, using the error synthesis model, and generating an error map, which visually expresses the created imaginary point.

According to an exemplary embodiment of the invention, the machine configuration definition module can include one or more selected from the group consisting of defining the drive axes of the multi-axis controlled machine, defining a posture of a tool, defining setting the squareness, and offset distances between the drive axes error.

According to an exemplary embodiment of the invention, the mechanistic structure definition module can define the drive axes of the multi-axis controlled machine by sequentially arranging the drive axes, which are oriented in forward and backward directions in a reference coordinate system of the multi-axis controlled machine.

According to an exemplary embodiment of the invention, the generalized error synthesis model is expressed by formulas:

$$\tau_{N_I}^{N_F} = \left(\tau_O^{N_I}\right)^{-1} \tau_O^{N_F} = \left[\begin{array}{c|c} \text{Rotation} & \text{Translation} \\ \hline 0 \ 0 \ 0 & 1 \end{array}\right]$$

$$\text{Rotation} = \left(\prod_{i=1}^{N_I} A_i\right)^T \prod_{i=1}^{N_F} A_i + \sum_{i=1}^{N_F}\left(\prod_{j=1}^{N_I} A_j\right)^T \prod_{j=0}^{i-1} A_j(S_i + E_i) \prod_{j=1}^{N_F} A_j -$$

$$\sum_{i=1}^{N_I} \left(\prod_{j=1}^{N_I} A_j\right)^T (S_i + E_i)\left(\prod_{j=1}^{i-1} A_j\right)^T \prod_{j=1}^{N_F} A_j$$

$$\text{Translation} = -\sum_{i=1}^{N_I}\left(\sum_{j=1}^{N_I} A_j\right)^T (o_i + t_i + d_i) + \sum_{i=2}^{N_I}\left(\prod_{j=1}^{N_I} A_j\right)^T S_i \sum_{j=1}^{i-1}\left(\prod_{k=j}^{i-1} A_k\right)^T t_j +$$

$$\sum_{i=1}^{N_I}\left(\sum_{j=1}^{N_I} A_j\right)^T E_i \sum_{j=1}^{i}\left(\prod_{k=j}^{i-1} A_k\right)^T t_j + \sum_{i=1}^{N_I}\left(\prod_{j=1}^{N_I} A_j\right)^T (S_i + E_i) \sum_{j=1}^{i}\left(\prod_{k=j}^{i-1} A_k\right)^T o_j +$$

$$\sum_{i=1}^{N_F}\left(\sum_{j=1}^{N_I} A_j\right)^T \prod_{j=1}^{i-1} A_j (o_i + t_i + d_i) + \sum_{i=1}^{N_I}\left(\prod_{j=1}^{N_I} A_j\right)^T \prod_{j=1}^{i-1} A_j S_i \sum_{j=1}^{N_F} \prod_{k=i-1}^{j-1} A_k t_j +$$

$$\sum_{i=1}^{N_F-1}\left(\prod_{j=1}^{N_I} A_j\right)^T \prod_{j=0}^{i-1} A_j E_i \sum_{j=i+1}^{N_F} \prod_{j=1}^{j-1} A_k t_j +$$

$$\sum_{i=1}^{N_F-1}\left(\prod_{j=1}^{N_I} A_j\right)^T \prod_{j=0}^{i-1} A_j (S_i + E_i) \sum_{j=i+1}^{N_F} \prod_{k=i}^{j-1} A_k o_j -$$

$$\left(\sum_{i=1}^{N_I}\left(\prod_{j=1}^{N_I} A_i\right)^T (S_i + E_i)\left(\prod_{j=0}^{i-1} A_j\right)^T\right)\left(\sum_{i=1}^{N_F-1} \prod_{j=0}^{i-1} A_j(o_i + t_i)\right)$$

According to an exemplary embodiment of the invention, the designated shape to be processed can be a frustum of a cone or a hemisphere.

According to exemplary embodiments of the present invention as set forth above, the method and apparatus for estimating error in a multi-axis controlled machine can evaluate geometric errors, which occur in a final result when the multi-axis controlled machine actually operates or moves, by calculating error vectors including geometric errors with respect to any shape of the orientations of points on a tool path or positioning vectors, such as a frustum of a cone or a hemisphere, without directly operating or moving the multi-axis controlled machine. In addition, since the method and apparatus is applicable to any types of multi-axis controlled machine having different configurations, the method and apparatus can be used for estimating the performance of a carrier system and in a simulation operation of an error compensation system.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

BRIEF DESCRIPTION OF THE DRAWINGS

FIG. 15A is a table showing an example of a process of inputting error measurement data according to an exemplary embodiment of the invention;

FIG. 15B is a table showing an example of motion parameter input values of the error measurement data according to an exemplary embodiment of the invention;

DETAILED DESCRIPTION OF THE INVENTION

Figure 1:
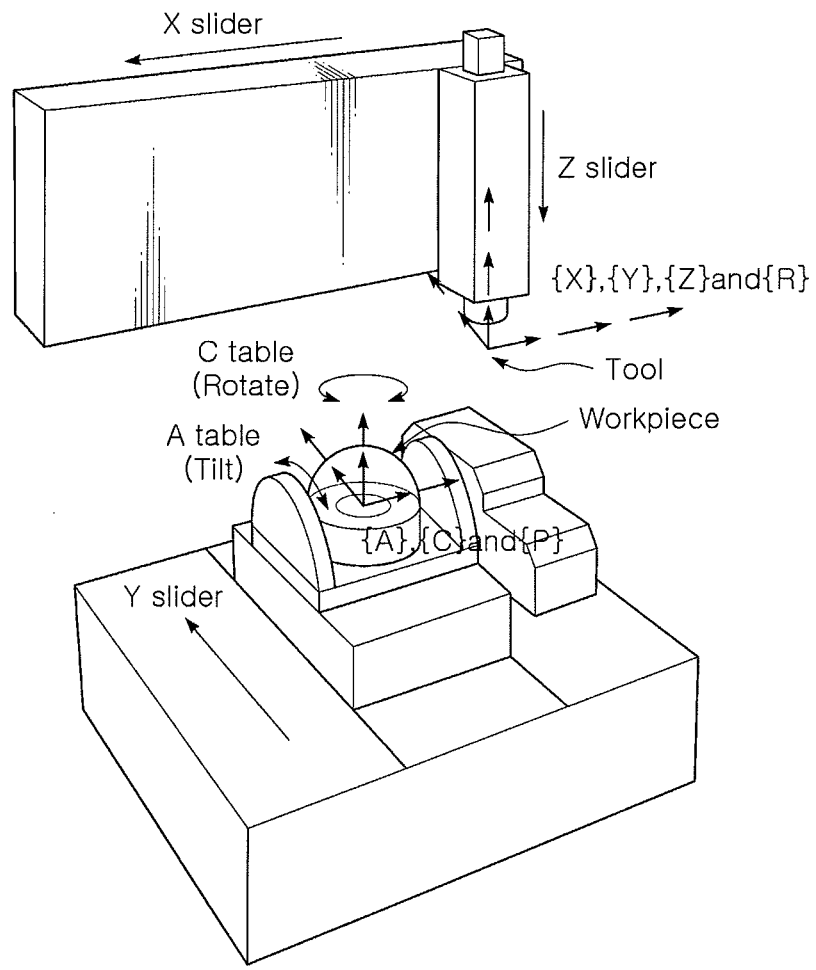
FIG. 1 is a perspective view showing an example of a multi-axis controlled machine.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments that may be included within the spirit and scope of the invention as defined by the appended claims.

In the following description of the present invention, detailed descriptions of known functions and components incorporated herein will be omitted when they may make the subject matter of the present invention unclear.

In addition, throughout this document, reference should be made to the drawings, in which the same reference numerals and signs are used throughout the different drawings to designate the same or similar components In addition, throughout this specification and the claims that follow, it will be understood that when an element is referred to as being "connected to" or "coupled to" another element, not only can it be "directly connected or coupled to" the other element, but also can it be "indirectly connected or coupled to" the other element via an intervening element. Unless explicitly stated to the contrary, the word "comprise" and its variations, such as "comprises" or "comprising" will be understood to imply the inclusion of stated elements but not the exclusion of any other elements.

Furthermore, the terminology "module" should be understood as indicating a unit that conducts a specific function or operation. The module can be embodied as a piece of hardware or software or a combination of hardware and software.

Basic Principle

FIG. 1 is a perspective view showing an example of a multi-axis controlled machine to which the present invention is applicable. Specifically, FIG. 1 shows a multi-axis machine tool that serves to process a workpiece having any shape.

The machine tool shown in FIG. 1 is an RRTFTT-type five-axis machine tool that has two rotary axes and three linear axes. Two drive axes, that is, X and Z axes, are used to displace the tool, whereas Y, A, and C axes are used to displace and rotate the workpiece. In other words, the tool linearly moves along the X and Z axes, whereas the workpiece tilts about the X axis using the A axis and rotates about the Z axis using the C axis while linearly moving along the Y axis. In the following description, the construction and operation of a method and apparatus for estimating error in a multi-axis controlled machine according to an exemplary embodiment of the invention will be described with reference to the five-axis machine tool by way of example.

Below, a description will first be given on basic principles and terminologies with respect to the method and apparatus for estimating error in a multi-axis controlled machine according to an exemplary embodiment of the invention.

Homogeneous Transform Matrix (HTM)

According to an exemplary embodiment of the present invention, an HTM is used in order to effectively express links and states of errors in a number of drive axes of a multi-axis controlled machine. The HTM can express the posture between two coordinate systems, using rotation (ROT) and translation (TRS) with respect to the posture. For this, the HTM according to an exemplary of the invention can be expressed as follows:

$$\tau_i^{i+1} = \left[ \begin{array}{c|c} ROT_{(3\times3)} & TRS_{(3\times1)} \\ \hline 0\ 0\ 0 & 1 \end{array} \right]$$

The HTM is a matrix that expresses the posture between {i} coordinate system and {i+1} coordinate system, in which ROT is expressed as a 3×3 matrix, indicating the orientation of the {i+1} coordinate system viewed from the {i} coordinate system, and TRS is expressed as a 3×1 vector, indicating the position of that point.

Definition of Local Coordinate System

Figure 2:
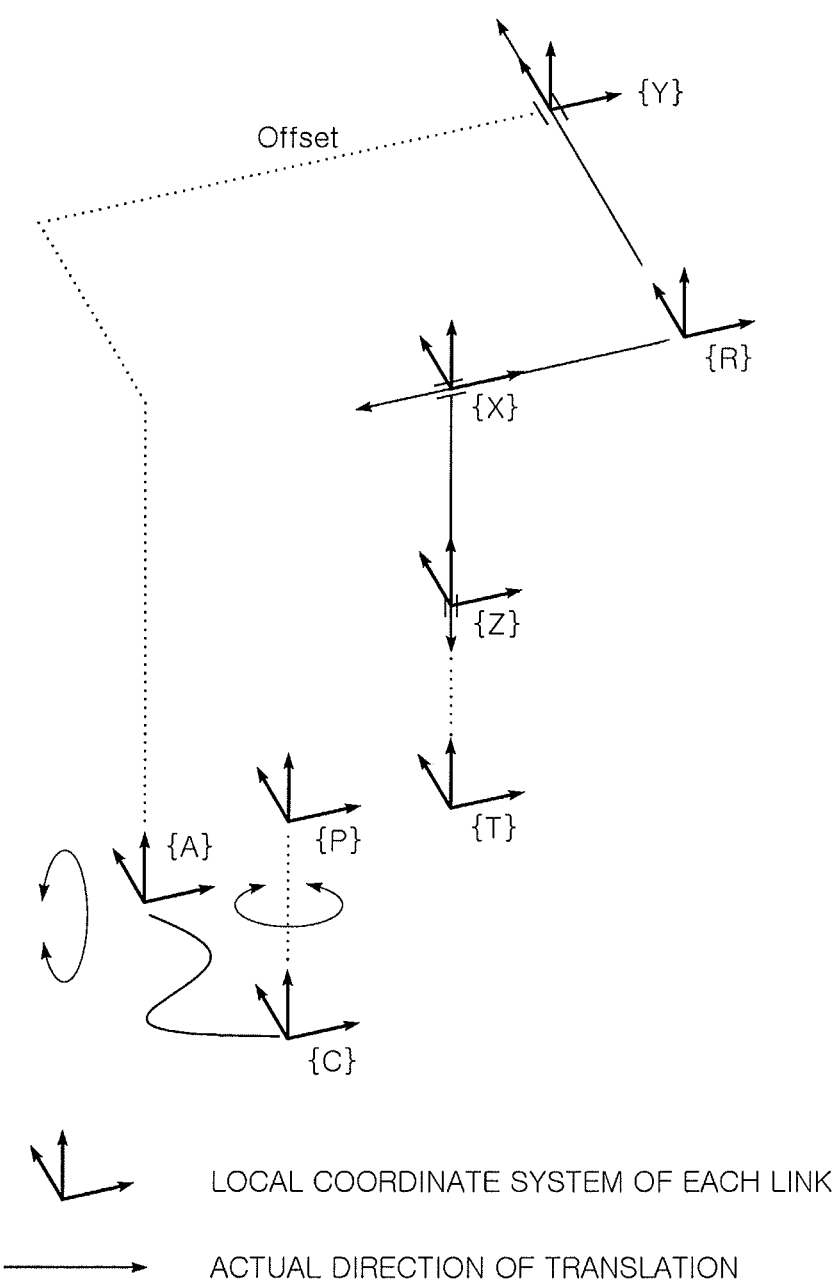
FIG. 2 is a diagram showing local coordinate systems according to an exemplary embodiment of the invention, which are set to respective drive axes of the multi-axis controlled machine shown in FIG. 1.

In addition, according to an exemplary embodiment of the invention, a local coordinate system on a respective drive axis (i.e., a linear or rotary axis) is defined on the basis of the home position of the multi-axis controlled machine. The local coordinate system of the RRFTTT-type five-axis machine tool, shown in FIG. 1, can be defined as shown in FIG. 2. Since the local coordinate system of each axis is set in the same orientation as a reference coordinate system is, the sign of a drive axis indicated by a machine controller can be different from that of the local coordinate system. For example, solid arrows in FIG. 2 indicates actual directions of translation, in which the actual directions of translation of X and Z axes are defined to be opposite to the signs of axes of the respective local coordinate systems.

In addition, the positions of the respective local coordinate systems are defined according to the structure of the machine. In the case of the machine shown in FIGS. 1 and 2, when all of the drive axes are located at their home positions, local coordinate systems {X}, {Y}, and {Z} of linear drive axes are located at the terminal end of a spindle or the terminal end of a tool like a tool coordinate system {T}, and local coordinate systems {A} and {C} of rotary drive axes are located at the point where the centers of rotation of the two axes meet. Therefore, as shown in FIG. 2, the centers of the linear and rotary axes are offset from each other.

The position of the reference coordinate system {R} is set so that it is consistent with that of the local coordinate systems {X}, {Y}, and {Z} of linear drive axes, and the orientation of the reference coordinate system is set in consideration of straight lines, which are produced from geometric errors and actual routes of translation of three linear axes using the least squares method. Then, the squareness error between the individual linear axes is calculated on the basis of this orientation.

Definition of Parameters

In addition, according to an exemplary embodiment of the invention, parameters are defined, as reported in Table 1 below, in order to express the relationships between the local coordinate systems of respective links of the multi-axis controlled machine. In Table 1 below, each parameter is expressed by a 4×4 HTM.

TABLE 1

| Parameter symbol | Title | Remarks |
| --- | --- | --- |
| OM | Offset | Home position in initial state with respect to previous coordinate system (including errors) |
| SM | Squareness | Orientation error in initial state with respect to previous coordination system (including initial orientation) |
| TM | Translation | Machine instruction of linear axes (X, Y, and Z axes) |
| AM | Rotation | Machine instruction of rotary table (A and C axes) |
| DM | Position error | Position error at point of machine instruction |
| EM | Angular error | Angular error at point of machine instruction |

In Table 1 above, OM and SM indicate the relationships in posture (i.e., orientation and position) between two continuous local coordinate systems, and TM and AM indicate machine input values for instructing operation of the linear and rotary axes. In addition, DM and EM are position-dependent geometric errors, which are different depending on their positions. DM and EM indicate error terms that are present in respective positions of translation and rotation whenever an individual drive axis is translated or rotated.

Below, a more detailed description will be given of the parameters.

Figure 3:
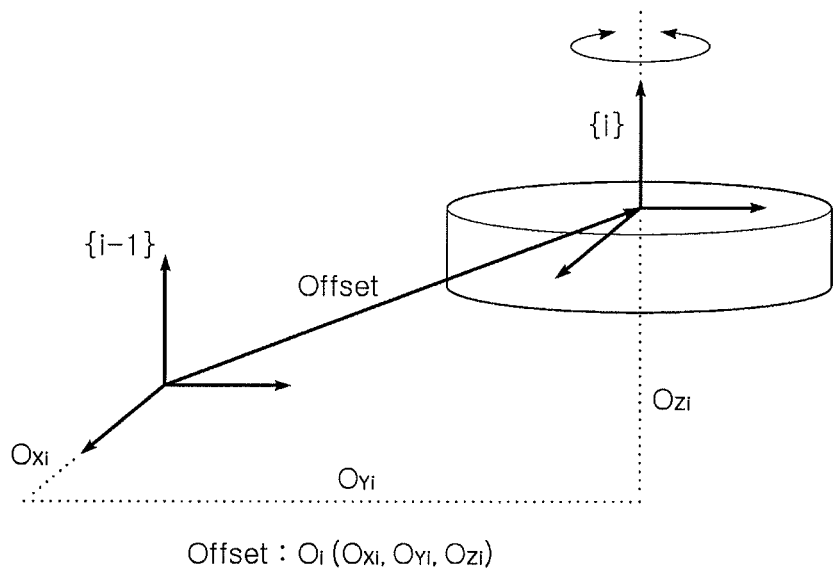
FIG. 3 is a diagram explaining an offset from among various parameters, which express the relationships between the local coordinate systems, according to an exemplary embodiment of the invention.

The offset OM is a parameter that indicates the position information between initially-defined local coordinate systems. In general, the offset is not considered for a three-axis machine tool since the machine tool can be translated so that all of three axes can meet at one point. However, it has to be considered always for the multi-axis machine tool since a rotary table includes an offset or offset error in the reference coordinate system. Due to error that occurs during the actual fabrication and assembly of a machine, error in dimension and assembly occurs in addition to the design offset. Such error is referred to as "offset error." When performing error synthesis modeling, the offset and the offset error can be considered as a bundle since they mathematically represent the same position component. Specifically, it can be considered as: offset=offset+offset error. As shown in FIG. 3, the offset between {i−1} coordinate system and the {i} coordinate system can be expressed by a 4×4 HTM, as in Formula 3 below, and the position vector of the HTM can be expressed separately using symbols.

$$OM_{i-1}{}^{i} = \begin{bmatrix} 1 & 0 & 0 & o_{xi} \\ 0 & 1 & 0 & o_{yi} \\ 0 & 0 & 1 & o_{zi} \\ 0 & 0 & 0 & 1 \end{bmatrix} = \begin{bmatrix} I & o_i \\ O^T & 1 \end{bmatrix} \equiv \begin{bmatrix} I & o_i \end{bmatrix}$$

Formula 1

Where, $$o_i = \begin{bmatrix} o_{xi} & o_{yi} & o_{zi} \end{bmatrix}^T, \quad 0 = \begin{bmatrix} 0 & 0 & 0 \end{bmatrix}^T$$

The squareness SM is a parameter that expresses the orientation of initially-defined local coordinate systems. When the Formula 1, mentioned above, is used in the initial setting, it is preferred that the orientations of all of the local coordinate systems, if possible, be set to be consistent with the directions of translation of drive axes. If the orientation of the reference coordinate system is the same as those of all of the local coordinate systems, the orientation components of the initial coordinate systems are expressed as a unit matrix. However, the squareness between the coordinate systems is inevitable due to error that occurs during the fabrication or assembly. In addition, like the offset, this parameter can be expressed mathematically by adding the initial orientation information and the squareness component. Furthermore, the squareness can also be expressed as including parallelism if a reference axis is considered differently.

That is, squareness=initial Orientation+squareness (parallelism). In general, because most of the local coordinate systems have a mechanical structure such that their initial orientations can be consistent with that of the reference coordinate system, the apparatus according to an exemplary embodiment of the invention disregards the initial setting of orientation.

Figure 4:
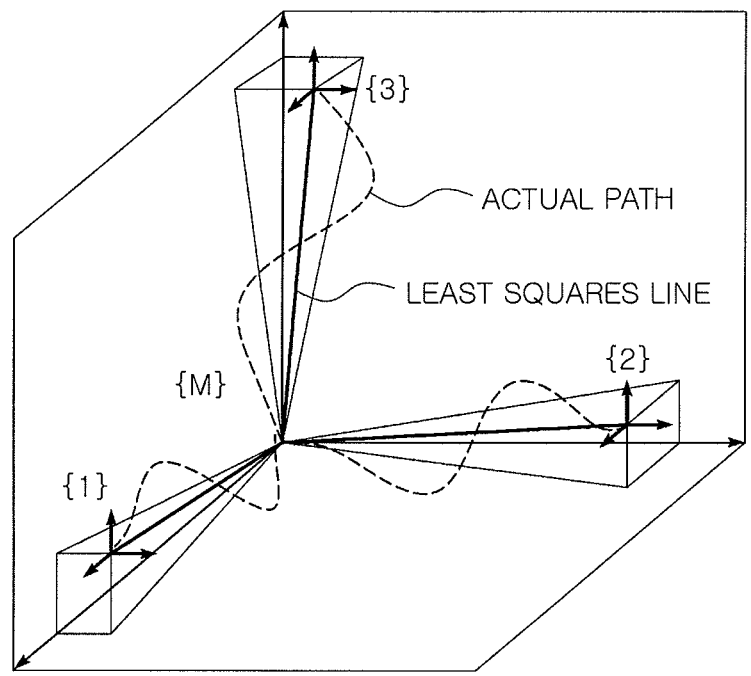
FIG. 4 is a diagram showing least squares lines, which are calculated on the basis of actual routes measured on three linear axes, according to an exemplary embodiment of the invention.
Figure 5:
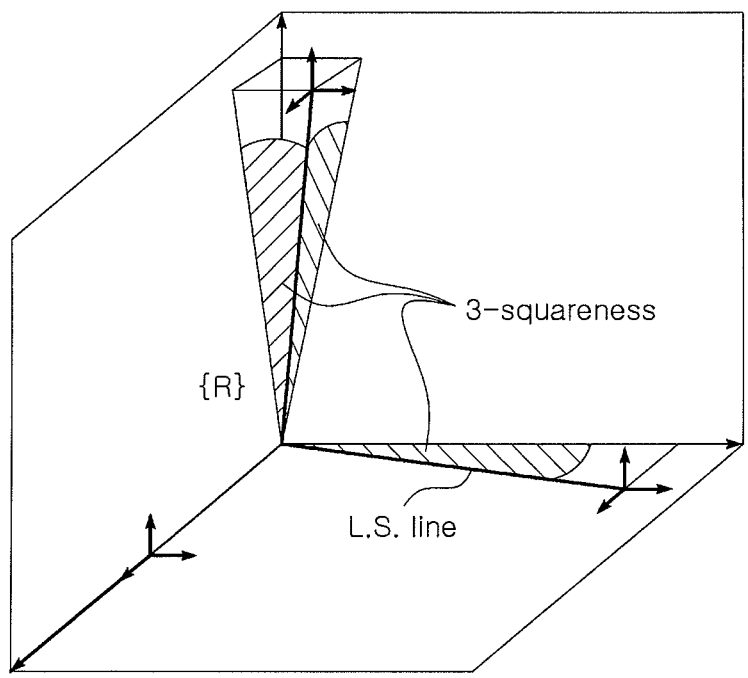
FIG. 5 is a diagram explaining squareness error about the routes along the linear axes, shown in FIG. 4, according to an exemplary embodiment of the invention.

The method of defining the squareness due to the geometric error separately considers the linear axis and the rotary axis. The squareness of the linear axis can be defined using least squares lines, which are obtained by applying the least squares method using points on the routes of actual translation. In the case of measuring routes of translation of the three linear axes on the basis of one specific coordinate system in FIG. 4, least squares lines can be produced by applying the least squares method to the routes of translation. The three least squares lines have a total of six errors in orientation, and as shown in FIG. 5, the squareness and the orientation of the reference coordinate system can be defined using the errors in orientation. For example, in a machine tool where {X}, {Y}, and {Z} local coordinate systems corresponding to the three linear axes are set as {1}, {2}, and {3}, if the x axis of the reference coordinate system {R} is brought to be consistent with the least squares line, corresponding to the route of translation of the {X} coordinate system, and the y axis of the reference coordinate system {R} is rotated about the x axis so as to be consistent with the plane defined by the least squares lines of the {X} and {Y} coordinate systems, three orientation error components about the reference coordinate system {R} become the squareness.

Figure 6:
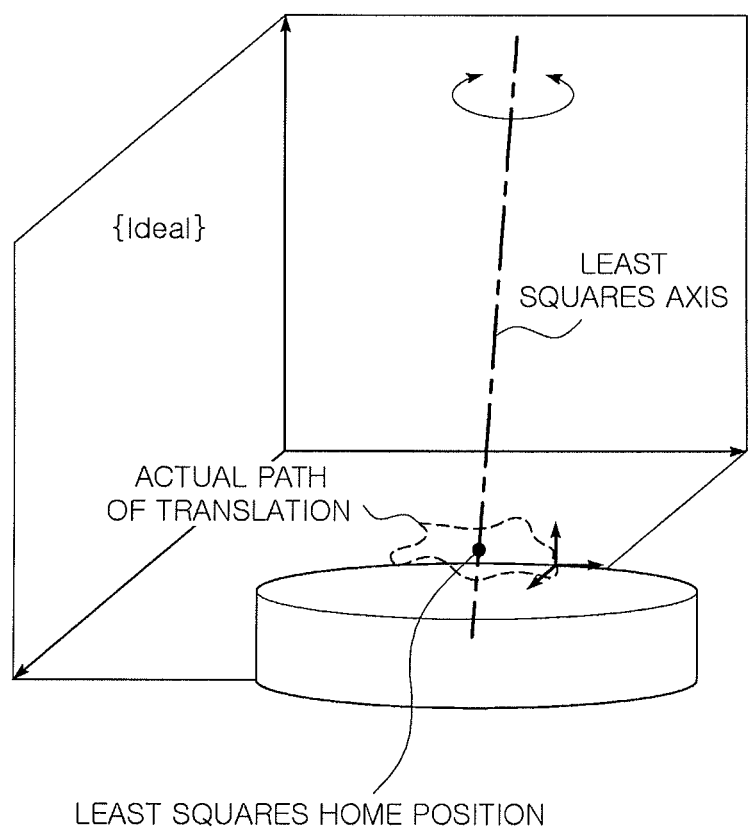
FIG. 6 is a diagram showing a least squares center and a central axis, calculated with respect to the translation of a table when a rotary axis is operating, according to an exemplary embodiment of the invention.
Figure 7:
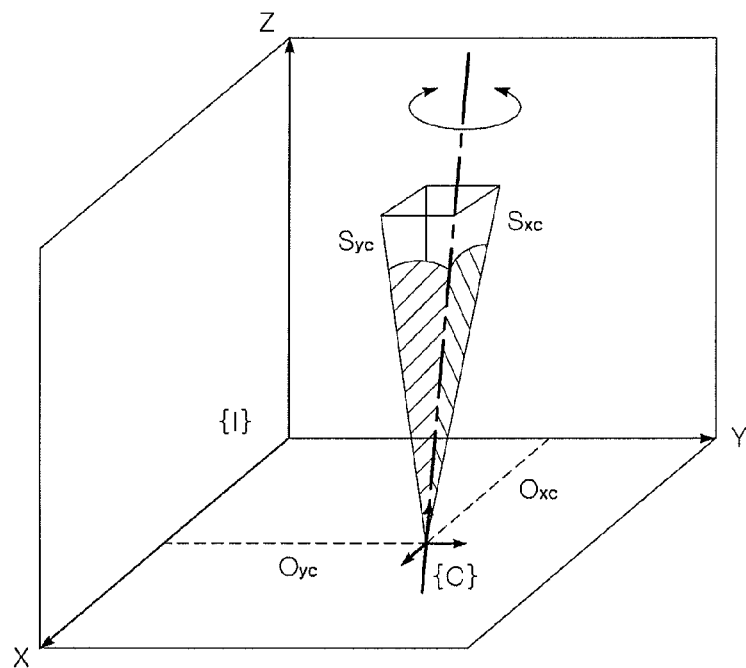
FIG. 7 is a diagram explaining the squareness and the offset error of the rotary axis, shown in FIG. 6, according to an exemplary embodiment of the invention.

Meanwhile, the squareness of the rotary axis is shown in FIGS. 6 and 7. As shown in FIG. 6, when the rotary table is operating, the least squares home position and the orientation of the central axis of rotation can be produced by applying the least squares method to actual routes of translation. If the local coordinate system is brought to be consistent with the point where the imaginary center of rotation meets the plane of an ideal coordinate system {Ideal}, two orientation error components occur as squareness, as shown in FIG. 7, and two offset errors are defined about the ideal coordinate system.

Therefore, the squareness SM between the coordinate systems can be expressed mathematically using the rotation components of the coordinate system. Since the squareness component is a sufficiently-small value of error, higher order terms can be omitted. Accordingly, the squareness SM can be expressed as in Formula 2 below. In addition, if a sub-matrix corresponding to the rotation component of a homogeneous transformation matrix SM is decomposed by the sum of a 3×3 unit matrix, it can be expressed by a skew matrix as in Formula 2 below.

Formula 2
$$SM_{i-1}{}^i = \begin{bmatrix} 1 & -s_{zi} & s_{yi} & 0 \\ s_{zi} & 1 & -s_{xi} & 0 \\ -s_{yi} & s_{zi} & 1 & 0 \\ 0 & 0 & 0 & 1 \end{bmatrix} = \begin{bmatrix} I+S_i & O \\ O^T & 1 \end{bmatrix} \equiv \begin{bmatrix} I+S_i & O \end{bmatrix}$$

Where,
$$S_i = \begin{bmatrix} 0 & -s_{zi} & s_{yi} \\ s_{zi} & 0 & -s_{xi} \\ -s_{yi} & s_{xi} & 0 \end{bmatrix}$$

In Formula 2 above, $S_{ji}$ indicates a squareness error component when the {i} coordinate system is rotated about the j axis. For example, $S_{zx}$ means squareness when the {X} coordinate system is rotated along the z axis, and indicates a squareness component defined by the xy planes.

Translation TM and rotation AM are machine instructions, which are input into the multi-axis controlled machine. TM includes information on the distance of linear translation, and AM includes information on the angle of rotation. TM and AM can be expressed by Formulae 3 and 4 below.

Formula 3
$$TM_{i-1}{}^i = \begin{bmatrix} 1 & 0 & 0 & t_{xi} \\ 0 & 1 & 0 & t_{yi} \\ 0 & 0 & 1 & t_{zi} \\ 0 & 0 & 0 & 1 \end{bmatrix} = \begin{bmatrix} I & t_i \\ O^T & 1 \end{bmatrix} \equiv \begin{bmatrix} I & t_i \end{bmatrix}$$

Where, $t_i = [t_{xi}\ t_{yi}\ t_{zi}]^T$

If a coordinate system is translated by an amount x along the X-axis, $t_x = [x\ 0\ 0]^T$
If a coordinate system is translated by an amount y along the Y-axis, $t_y = [0\ y\ 0]^T$
If a coordinate system is translated by an amount z along the Z-axis, $t_z = [0\ 0\ z]^T$ Formula 4
$$AM_{i-1}{}^i = \begin{bmatrix} A_i & O \\ O^T & 1 \end{bmatrix} \equiv \begin{bmatrix} A_i & O \end{bmatrix}$$

If a coordinate system is rotated by an amount a about the X-axis,
$$A_a = \begin{bmatrix} 1 & 0 & 0 \\ 0 & \cos a & -\sin a \\ 0 & \sin a & \cos a \end{bmatrix}$$

If a coordinate system is rotated by an amount b about the Y-axis,
$$A_b = \begin{bmatrix} \cos b & 0 & \sin b \\ 0 & 1 & 0 \\ -\sin b & 0 & \cos b \end{bmatrix}$$

If a coordinate system is rotated by an amount c about the Z-axis,
$$A_c = \begin{bmatrix} \cos c & -\sin c & 0 \\ \sin c & \cos c & 0 \\ 0 & 0 & 1 \end{bmatrix}$$

Here, the centers of rotation of a, b, and c axes are consistent with the orientations of x, y, and z axes of the reference coordinate system.

Finally, when the linear axis or rotary axis operates in response to the machine instruction, each local coordinate system always accompanies with geometric errors, which include position error DM and angular error EM. These errors are also referred to as Position-Dependent Geometric Error Parameters (PDGEP) since they are different depending on the points of respective machine instructions.

Figure 8:
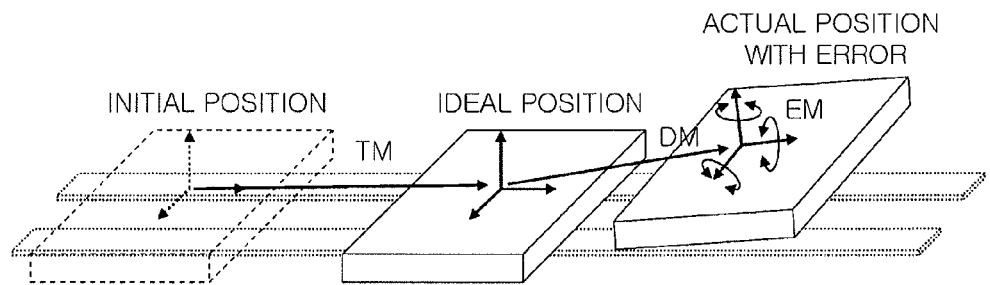
FIG. 8 is a diagram explaining position error and angular error from among various parameters, which express the relationships between local coordinate systems, according to an exemplary embodiment of the invention.

FIG. 8 illustrates an ideal final point, which occurs when the linear drive axis operates according to the machine instruction, and an actual position, which is changed by actual geometric error. In this case, the angular error EM and the position error DM can be expressed by Formulae 5 and 6 below. (Refer to FIG. 6B as for the definition of the rotary drive axis.) Since terms of angular errors are sufficiently-small values of errors like the squareness, higher order terms can be omitted Formula 5
$$EM_{i-1}{}^i = \begin{bmatrix} 1 & -\varepsilon_{zi} & \varepsilon_{yi} & 0 \\ \varepsilon_{zi} & 1 & -\varepsilon_{xi} & 0 \\ -\varepsilon_{yi} & \varepsilon_{zi} & 1 & 0 \\ 0 & 0 & 0 & 1 \end{bmatrix} = \begin{bmatrix} I+E_i & O \\ O^T & 1 \end{bmatrix} \equiv \begin{bmatrix} I+E_i & O \end{bmatrix}$$

Where,
$$E_i = \begin{bmatrix} 0 & -\varepsilon_{zi} & \varepsilon_{yi} \\ \varepsilon_{zi} & 0 & -\varepsilon_{xi} \\ -\varepsilon_{yi} & \varepsilon_{xi} & 0 \end{bmatrix}$$

Formula 6
$$DM_{i-1}{}^i = \begin{bmatrix} 1 & 0 & 0 & \delta_{xi} \\ 0 & 1 & 0 & \delta_{yi} \\ 0 & 0 & 1 & \delta_{zi} \\ 0 & 0 & 0 & 1 \end{bmatrix} = \begin{bmatrix} I & d_i \\ O^T & 1 \end{bmatrix} \equiv \begin{bmatrix} I & d_i \end{bmatrix}$$

Where,
$$d_i = \begin{bmatrix} \delta_{xi} & \delta_{yi} & \delta_{zi} \end{bmatrix}^T$$

Here, $\varepsilon_{ji}$ indicates rotational error components about the j axis, when the {i} coordinate system operate. The three rotational error components occurring from the three linear axes include "roll," "pitch," and "yaw." Of the three errors occurring from the rotary drive axis, the rotational error component along the central axis of rotation is referred to as "angular positioning error" and the other two rotational error components, which are not with the central axis of rotation, are referred to as "tilt errors."

In addition, $\delta_{ji}$ indicates position error components in the j axial direction when the {i} coordinate system operates. In the three linear axes, if i=j, it is linear displacement error, and in the case of i≠j, it is straightness. Of the three errors of the rotary drive axis, axial error occurs if the j direction coincides with the direction of the central axis of rotation, and radial error occurs if the j direction does not coincides with the direction of the central axis of rotation.

Method of Producing Generalized Error Synthesis Model

According to the invention, it is possible to produce an error synthesis model using the parameters and coordinate systems, which are defined as above. For this, a generalized error synthesis model, which can be used widely in the multi-axis controlled machine having any structure and any number of axes, is required. The generalized error synthesis model can be designed as follows.

When individual drive axes of the multi-axis controlled machine are translated or rotated, a posture of each drive axis at one time point can be produced by kinematic error modeling. Here, the kinematic models of the linear and rotary axes are expressed by Formula 7 and 8 below.

$$\tau^L_{i-1} = OM\ SM\ TM\ DM\ EM|^L_{i-1} \quad \text{Formula 7}$$
$$= [I|o_L][I+S_L|0][I|t_L][I|d_L][I+E_L|0]$$

$$\tau^R_{i-1} = OM\ SM\ DM\ EM\ AM|^R_{i-1} \quad \text{Formula 8}$$
$$= [I|o_R][I+S_R|0][I|d_R][I+E_R|0][A_R|0]$$

Figure 9A:
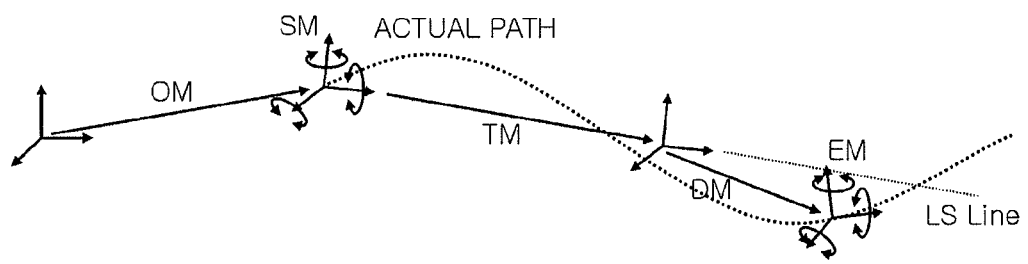
FIGS. 9A and 9B are diagrams explaining kinematic modeling of the linear and rotary axes in the multi-axis controlled machine.
Figure 9B:
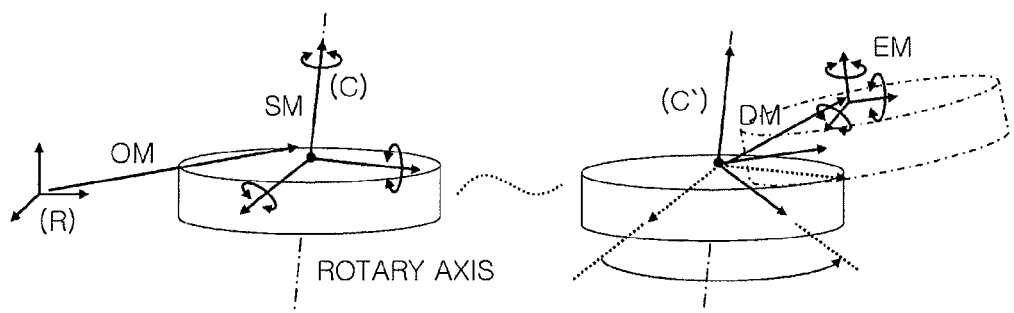

FIGS. 9A and 9B are diagrams explaining the kinematic modeling of the linear and rotary axes. As in Formula 8, DM and EM in the model of the rotary axis, unlike in the model of the linear axis, are defined on the basis of a coordinate system that includes OM and SM regardless of the rotary drive value.

It is required to separate the modeling of the linear axis (slide) from the modeling of the rotary axis (turntable/tilting table) in order to realize the generalized error synthesis model in the multi-axis controlled machine. For this purpose, a unified model for any drive axis is defined as follows, by combining the model of linear and rotary axis, which was described above.

Linear Axis:

$$\tau^L_{i-1} = OM\ SM\ TM\ DM\ EM|^L_{i-1}$$

Rotary axis:

$$\tau^R_{i-1} = OM\ SM\ DM\ EM\ AM|^R_{i-1}$$

$$\rightarrow$$

$$\tau^A_{i-1} = OM\ SM\ TM\ DM\ EM\ AM|^A_{i-1}: \text{Arbitrary axis}$$

When a program is executed, the kinematic error model defined as above is divided into the linear axis part and the rotary axis part according to individual structures as below as soon as the shape and structure of the system are input. The linear axis part and the rotary axis part are defined as below.

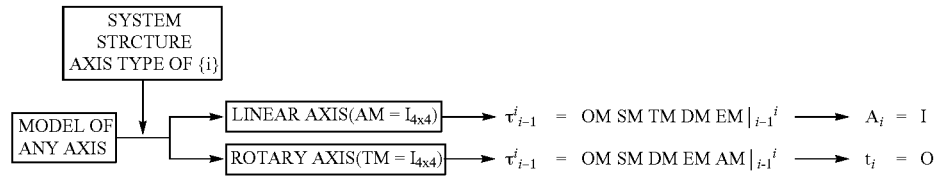

Meanwhile, the final kinematic error model of any axis, which is defined as above, is derived as in Formula 9 below.

Formula 9

$$\tau^1_0 = OM\ SM\ TM\ DM\ EM\ AM|^1_0$$

$$= [I|o_1][I+S_1|0][I|t_1][I|d_1][I+E_1|0][A_1|0]$$

$$= [A_1+E_1A_1+S_1A_1+E_1S_1A_1|d_1+o_1+d_1S_1+t_1+S_1t_1]$$

$$= [A_1+E_1A_1+S_1A_1|o_1+t_1+d_1+S_1t_1]$$

Here, since errors have sufficiently-small values in general, higher order terms can be neglected during the error synthesis modeling. Therefore, it is more convenient to omit the higher order terms first during the error modeling of each drive axis as above, rather than to exclude the higher order terms after the final error synthesis model is produced.

The multi-axis controlled machine is embodied by continuously connecting a number of drive axes (rotary axes and linear axes) to each other. When viewed in the connecting direction, the axes may be connected in forward direction with respect to the reference coordinate system or in backward direction with respect to the home position of the machine.

$N_F$ numbers of drive axes of the multi-axis controlled machine, continuously connected from the reference coordinate system {0}, are expressed by models of matrix multiplication as in Formula 9, and the result of this modeling is defined by Formula 10 below.

Formula 10

$$\tau^{N_F}_0 = \prod_{i=1}^{N_F} \tau^i_{i-1} = \begin{bmatrix} \text{Rotation} & | & \text{Translation} \\ \hline 0\ 0\ 0 & | & 1 \end{bmatrix}$$

$$\text{Rotation} = \prod_{i=1}^{N_F} A_i + \sum_{i=1}^{N_F-1} \prod_{j=0}^{i-1} A_j(S_i+E_i) \prod_{j=i}^{N_F} A_j$$

$$\text{Translation} = \sum_{i=1}^{N_F-1} \prod_{j=0}^{i-1} A_j(t_i+d_i+o_i) +$$

$$\sum_{i=1}^{N_F-1} \prod_{j=0}^{i-1} A_j S_i \sum_{j=i}^{N_F-1} \prod_{k=i-1}^{j-1} A_k d_j +$$

$$\sum_{i=1}^{N_F-1} \prod_{j=0}^{i-1} A_j E_i \sum_{j=i+1}^{N_F-1} \prod_{k=0}^{j-1} A_k d_j +$$

$$\sum_{i=1}^{N_F-1} \prod_{j=0}^{i-1} A_j(S_i+E_i) \sum_{j=i+1}^{N_F} \prod_{k=i}^{j-1} A_k o_j$$

Where $\tau_i^j$: transform matrix from {j} coordinate system to {i} coordinate system $N_F$: number of drive axes connected in forward direction in reference coordinate system $o_i$: 3×1 vector representing offset between drive axes $S_i$: 3×3 skew matrix representing squareness between drive axes $t_i$: 3×1 vector representing translation input value of linear slide $A_i$: 3×3 rotation conversion matrix representing rotation input values of rotary table $d_i$: 3×1 vector representing position error at point of input value of drive axis $E_i$: 3×3 skew matrix representing angular error at a point of input value of drive axis i, j, k are dummy variables as the indices of summation operator ($\Sigma$) or product operator ($\Pi$).

where $$\sum_{i=m}^{n} x_i = x_m + x_{m+1} + \ldots + x_{n-1} + x_n \left( \text{or } \prod_{i=m}^{n} x_i = x_m x_{m+1} \ldots x_{n-1} x_n \right)$$

represents summation (or product) operator of adding (or multiplying) a sequence of terms as a mathematical notion, x means an indexed variable representing each successive term in the series, i represents the index of summation as a dummy variable, and m and n indicate the lower and upper bounds of summation.

Figure 10A:
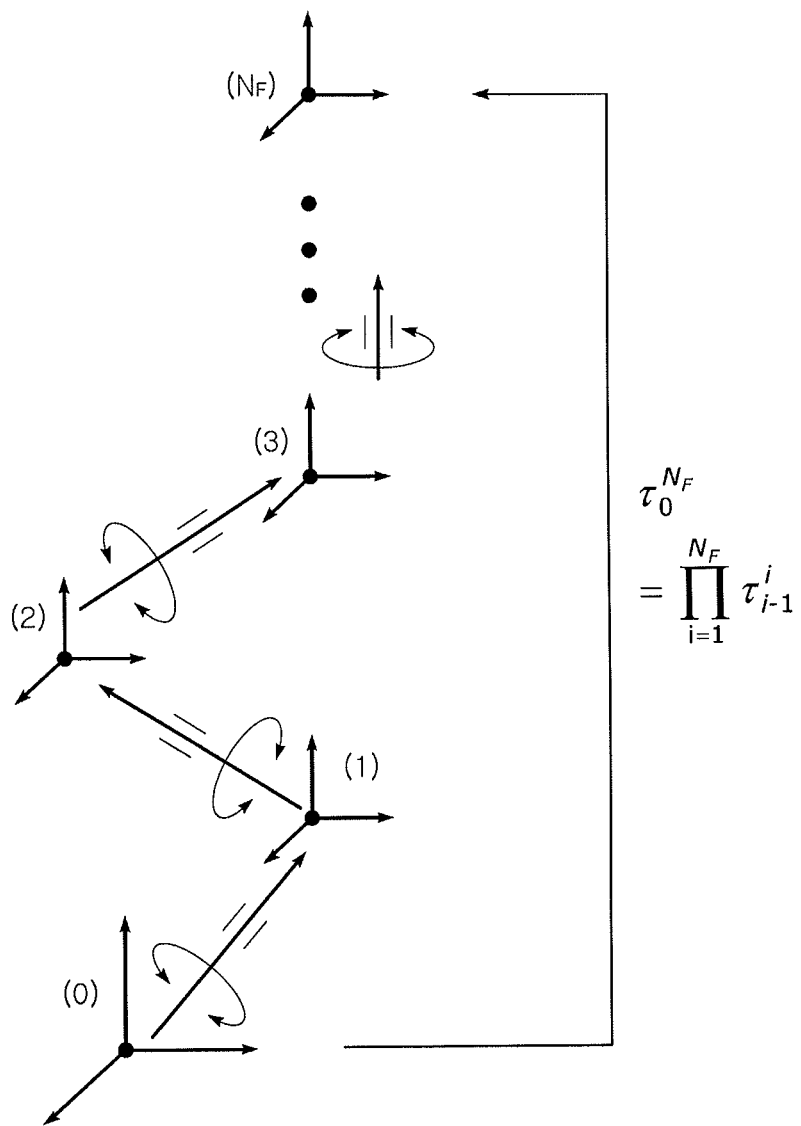
FIG. 10*a* is a diagram showing an illustrative structure in which a number of drive axes are connected in forward direction with respect to a reference coordinate system in the multi-axis controlled machine.
Figure 10B:
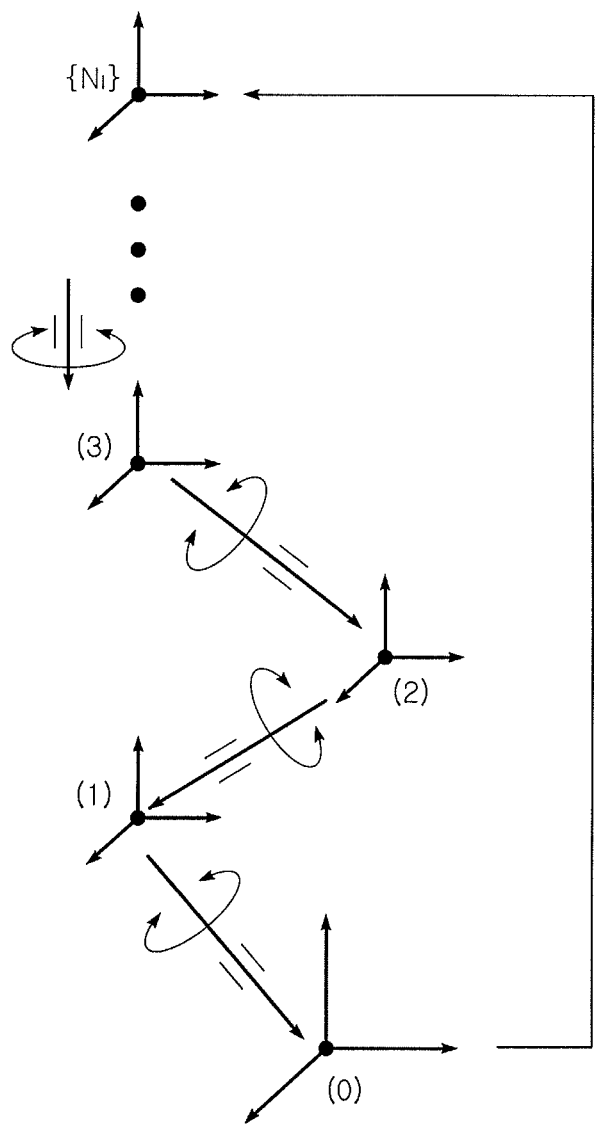
FIG. 10b is a diagram showing an illustrative structure in which a number of drive axes are connected in inverse direction with respect to a reference coordinate system in the multi-axis controlled machine.

FIG. 10b shows local coordinate systems about $N_F$ number of drive axes, which are connected continuously in backward direction with respect to the reference coordinate system. For the kinematic error modeling of the drive axes, which are connected in backward direction, it is essential to produce an inverse matrix of each parameter. In practice, inverse conversion of a matrix, which includes unknown variables, using a computer is especially difficult and consumes a massive amount of time. Therefore, technology capable of simplifying the inversion conversion is necessary. First, inversion matrixes of TM, OM, and DM, which include position vector components, have negative position vectors as expressed in Formula 11 below.

$(OM)^{-1} \equiv [I|o]^{-1} = [I|-o]$ $(TM)^{-1} \equiv [I|t]^{-1} = [I|-t]$ $(DM)^{-1} \equiv [I|d]^{-1} = [I|-d]$     Formula 11

Since AM is an orthogonal matrix, the inversion matrix of AM, which represents the rotation of the rotary drive axis, can be produced by a transpose matrix as in Formula 12 below.

$\therefore (Am)^{-1} \equiv [A|0]^{-1} = [A^T|0]$     Formula 12

Finally, since the rotation components of EM and SM are decomposed by a sum of skew matrices as in Formulae 2 and 5 above, the inverse matrices of EM and SM are produced by Neumann series as in Formula 13 below.

$(EM)^{-1} \equiv [I+E_i|0]^{-1} \approx [I-E_i|0]$ $(SM)^{-1} \equiv [I+S_i|0]^{-1} = [I-S_i|0]$     Formula 13

It is possible to perform kinematic error modeling on the drive axes, which are connected in both directions, by applying the inverse matrices in Formulae 11 and 12. This can also be rearranged by performing mathematical modeling again, and be derived into Formula 13 below. In this deriving process, it is possible to improve the efficiency by omitting higher order terms of errors before producing a final model.

Formula 14

$$(\tau_0^{N_I})^{-1} = \prod_{i=N_I}^{1} (\tau_{i-1}^i)^{-1} = \begin{bmatrix} \text{Rotation} & | & \text{Translation} \\ 0\ 0\ 0 & | & 1 \end{bmatrix}$$

$$\text{Rotation} = \left(\prod_{i=1}^{N_I} A_i\right)^T - \sum_{i=1}^{N_I} \left(\prod_{j=i}^{N_I} A_j\right)^T (S_i + E_i) \left(\prod_{j=o}^{i-1} A_j\right)^T$$

$$\text{Translation} = -\sum_{i=1}^{N_I} \left(\sum_{j=1}^{N_I} A_j\right)^T (o_i + t_i + d_i) +$$

$$\sum_{i=2}^{N_I} \left(\sum_{j=i}^{N_I} A_j\right)^T S_i \sum_{j=1}^{i-1} \left(\prod_{k=j}^{i-1} A_k\right)^T t_j +$$

$$\sum_{i=1}^{N_I} \left(\sum_{j=i}^{N_I} A_j\right)^T E_i \sum_{j=1}^{i} \left(\prod_{k=j}^{i-1} A_k\right)^T t_j +$$

$$\sum_{i=1}^{N_I} \left(\sum_{j=i}^{N_I} A_j\right)^T (S_i + E_i) \sum_{j=1}^{i} \left(\prod_{k=j}^{i-1} A_k\right)^T o_j$$

Where $\tau_i^j$: transform matrix from {j} coordinate system to {i} coordinate system $N_I$: number of drive axes connected in backward direction in reference coordinate system $o_i$: 3×1 vector representing offset between drive axes $S_i$: 3×3 skew matrix representing squareness between drive axes $t_i$: 3×1 vector representing translation input value of linear slide $A_i$: 3×3 rotation conversion matrix representing rotation input values of i th rotary table $d_i$: 3×1 vector representing position error at point of input value of drive axis $E_i$: 3×3 skew matrix representing angular error at a point of input value of drive axis T: Transpose of a matrix i, j, k are dummy variables as the indices of summation operator or product operator.

The multi-axis controlled machine can be connected in forward direction or backward direction with respect to the reference coordinate system. Thus, for the purpose of versatility, the present invention defines an error synthesis model generalized to multi-axis controlled machines by performing mathematical modeling in consideration of NF number of drive axes, which are connected in forward direction with respect to the reference coordinate system, and NI number of drive axes, which are connected in backward direction with respect to the reference coordinate system. The generalized error synthesis model is expressed finally by Formula 15 below. This deriving process can also improve efficiency by omitting higher order terms of errors before producing the final model.

Formula 15

$$\tau_{N_I}^{N_F} = (\tau_0^{N_I})^{-1} \cdot \tau_0^{N_F} = \begin{bmatrix} \text{Rotation} & | & \text{Translation} \\ 0\ 0\ 0 & | & 1 \end{bmatrix}$$

-continued $$\text{Rotation} = \left(\prod_{i=1}^{N_I} A_i\right)^T \prod_{i=1}^{N_F} A_i + \sum_{i=1}^{N_F} \left(\prod_{j=i}^{N_I} A_j\right)^T \prod_{j=0}^{i-1} A_j(S_i+E_i) \prod_{j=i}^{N_F} A_j -$$

$$\sum_{i=1}^{N_I} \left(\prod_{j=i}^{N_I} A_j\right)^T (S_i+E_i) \left(\prod_{j=0}^{i-1} A_j\right)^T \prod_{j=1}^{N_F} A_j$$

$$\text{Translation} = -$$

$$\sum_{i=1}^{N_I} \left(\sum_{j=i}^{N_I} A_j\right)^T (o_i + t_i + d_i) + \sum_{i=2}^{N_I} \left(\prod_{j=i}^{N_I} A_j\right)^T S_i \sum_{j=1}^{i-1} \left(\prod_{k=j}^{i-1} A_k\right)^T t_j +$$

$$\sum_{i=1}^{N_I} \left(\sum_{j=i}^{N_I} A_j\right)^T E_i \sum_{j=1}^{i} \left(\prod_{k=j}^{i-1} A_k\right)^T t_j + \sum_{i=1}^{N_I} \left(\sum_{j=i}^{N_I} A_j\right)^T (S_i+E_i) \sum_{j=1}^{i} \left(\prod_{k=j}^{i-1} A_k\right)^T o_j +$$

$$\sum_{i=1}^{N_F} \left(\prod_{j=i}^{N_I} A_j\right)^T \prod_{j=0}^{i-1} A_j (o_i + t_i + d_i) + \sum_{i=1}^{N_I} \left(\prod_{j=i}^{N_I} A_j\right)^T \prod_{j=0}^{i-1} A_j S_i \sum_{j=i}^{N_F j-1} \prod_{k=i-1}^{} A_k t_j +$$

$$\sum_{i=1}^{N_F-1} \left(\prod_{j=i}^{N_I} A_j\right)^T \prod_{j=0}^{i-1} A_j E_i \sum_{j=i+1}^{N_F j-1} \prod_{k=j}^{} A_k t_j +$$

$$\sum_{i=1}^{N_F-1} \left(\prod_{j=i}^{N_I} A_j\right)^T \prod_{j=0}^{i-1} A_j(S_i+E_i) \sum_{j=i+1}^{N_F j-1} \prod_{k=i}^{} A_k o_j -$$

$$\left(\prod_{i=1}^{N_I} \left(\prod_{j=i}^{N_I} A_i\right)^T (S_i+E_i) \left(\prod_{j=0}^{i-1} A_j\right)^T \right) \left(\sum_{i=1}^{N_F i-1} \prod_{j=0}^{} A_j(o_i + t_i)\right)$$

where $\tau_i^j$: transform matrix from {j} coordinate system to {i} coordinate system, $N_F$: number of drive axes connected in forward direction in reference coordinate system $N_I$: number of drive axes connected in backward direction in reference coordinate system $o_i$: 3×1 vector representing offset between drive axes $S_i$: 3×3 skew matrix representing squareness between drive axes $t_i$: 3×1 vector representing translation input value of linear slide $A_i$: 3×3 rotation conversion matrix representing rotation input values of rotary table $d_i$: 3×1 vector representing position error at point of input value of drive axis $E_i$: 3×3 skew matrix representing angular error at a point of input value of drive axis T: Transpose of a matrix i, j, k are dummy variables as the indices of summation operator or product operator.

Here, $\tau_{N_I}^{N_F}$ is an HTM that represents the posture of the local coordinate system that is located at the terminal end of the forward direction, when viewed from the local coordinate system that is located at the terminal end of the backward direction. Rotation indicates a 3×3 sub-matrix that represents rotation components in the posture between the two coordinate systems, and Translation indicates a 3×1 position vector that represents translation components between the two coordinate systems. In addition, $N_I$ indicates the number of the drive axes in backward direction, and $N_F$ indicates the numbers of the drive axes in forward direction.

For example, a multi-axis machine tool has an $N_I$ number of drive axes from the reference coordinate system to a workpiece coordinate system and an $N_F$ number of drive axes from the reference coordinate system to tool coordinate system. In addition, Rotation and Translation indicate the orientation and position of the tool coordinate system viewed from the workpiece coordinate system.

The error synthesis model generalized as above can be used in any structure of combination, which includes linear and rotary axes, by applying geometric models to any axes. In addition, it is possible to generalize this model by simultaneously considering forward and inverse kinematic chains. Furthermore, the modeling can be performed by omitting higher order terms of errors in advance to avoid tedious calculations, and the final error synthesis model can be produced in both forward and backward directions irrespective of the number of axes.

For example, when an error synthesis model of the five-axis machine tool shown in FIG. 5 is produced, kinematic error models are defined as in Formula 16 below. One of the kinematic error models includes error of the multi-axis controlled machine, whereas the other kinematic error model does not include error of the multi-axis controlled model. In Formula 16 below, Nominal indicates a synthesis model that represents an ideal state without error, whereas Actual indicates an actual error synthesis model with error.

$$\tau_p^t|_{Nominal} = (\tau_R{}^Y\tau_Y{}^A\tau_A{}^C\tau_C{}^P)^{-1}\tau_R{}^X\tau_X{}^Z\tau_Z{}^t|_{Nominal}$$

$$\tau_p^t|_{Actual} = (\tau_R{}^Y\tau_Y{}^A\tau_A{}^C\tau_C{}^P)^{-1}\tau_R{}^X\tau_X{}^Z\tau_Z{}^t|_{Actual} \quad \text{Formula 16}$$

In addition, when the final posture error of the five-axis machine tool is produced using the above-described generalized error synthesis model, it is produced as in Formula 17 below.

Formula 17

$$\text{Error} = (\tau_p^t|_{Nominal})^{-1} (\tau_p^t|_{Actual})$$

$$= \begin{bmatrix} 1 & -Y_z & Y_y & n_x \\ Y_z & 1 & -Y_x & n_y \\ -Y_y & Y_x & 1 & n_z \\ 0 & 0 & 0 & 1 \end{bmatrix} \text{ Where,}$$

$Y_x = -\varepsilon_{xa} - \varepsilon_{xc} + \varepsilon_{xx} - \varepsilon_{xy} - \varepsilon_{xz}$ $Y_y = -\varepsilon_{ya} + \varepsilon_{yx} + \varepsilon_{yy} + \varepsilon_{yz} + s_{yz} - (\varepsilon_{yc} + s_{yz})\cos a + \varepsilon_{zc}\sin a$ $Y_z = -\varepsilon_{za} + \varepsilon_{zx} - \varepsilon_{zy} + \varepsilon_{zz} - \varepsilon_{zc}\cos a - (\varepsilon_{yc} + s_{yz}) - \sin a$ $n_x = -\delta_{xa} - \delta_{xc} + \delta_{xx} - \delta_{xy} + \delta_{xz} - \varepsilon_{za}o_{ya} - \varepsilon_{zc}o_{yc} + \varepsilon_{ya}o_{za} +$
$\varepsilon_{yc}o_{zc} + o_{zc}s_{yz} - o_{ya}s_{zx} - \varepsilon_{za}y - \varepsilon_{zy}y - s_{zx}y - \varepsilon_{ya}z + \varepsilon_{yx}z -$
$\varepsilon_{yy}z + s_{yz}z - \{\varepsilon_{zc}(o_{ya}+y) - (\varepsilon_{yc}+s_{yz})(o_{za}-z)\}\cos a -$
$\{\varepsilon_{yc}(o_{ya}+y) + s_{yz}(o_{ya}+y) + \varepsilon_{zc}(o_{za}-z)\}\sin a$ $n_y = -\delta_{ya} + \delta_{yx} - \delta_{yy} + \delta_{yz} + \varepsilon_{za}o_{xa} - \varepsilon_{xa}o_{za} - \varepsilon_{xc}o_{za} - o_{za}s_{xz} +$
$o_{xa}s_{zx} - \varepsilon_{za}x - \varepsilon_{zy}x + \varepsilon_{xa}z + \varepsilon_{xx}z + \varepsilon_{xy}z -$
$\{\delta_{yc} + o_{zc}(\varepsilon_{xc} + s_{xz}) + \varepsilon_{zc} (-o_{xa} - o_{xc} + x)\}\cos a +$
$\{\delta_{zc} + \varepsilon_{xc}o_{yc} - o_{yc}s_{xz} + o_{xa}s_{yz} + o_{xc}s_{yz} + \varepsilon_{yc}(o_{xa} + o_{xc} - x) -$
$s_{yz}x\}\sin a$ $n_z = -\delta_{za} + \delta_{zx} - \delta_{zy} + \delta_{zz} - \varepsilon_{ya}o_{xa} + \varepsilon_{xa}o_{ya} + \varepsilon_{xc}o_{ya} + o_{ya}s_{xz} +$
$\varepsilon_{ya}x + \varepsilon_{yy}x + \varepsilon_{xa}y + \varepsilon_{xc}y + \varepsilon_{xy}y + s_{xz}y +$
$\{-\delta_{zc} + \varepsilon_{xc}o_{yc} + o_{yc}s_{xz} - o_{xa}s_{yz} - o_{xc}s_{yz} + s_{yz}x +$
$\varepsilon_{yc}(-o_{xa} - o_{xc} + x)\}\cos a - \{\delta_{yc} + o_{zc}(\varepsilon_{xc} + s_{xz}) +$
$\varepsilon_{zc}(-o_{xa} - o_{xc} + x)\}\sin a$ The present invention intends to estimate the error of multi-axis controlled machines using the error synthesis model generalized as above.

Figure 11:
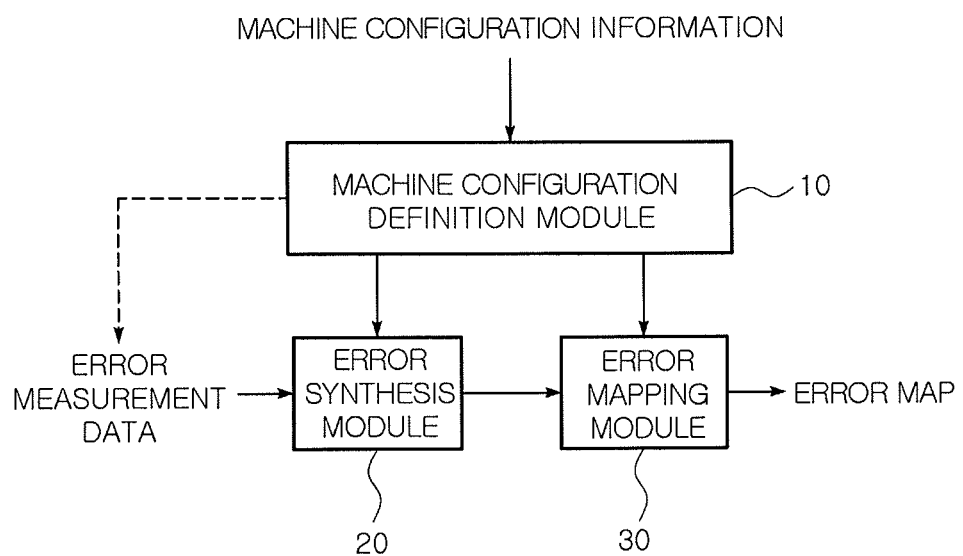
FIG. 11 is a block diagram showing the apparatus for estimating error in a multi-axis controlled machine according to an exemplary embodiment of the invention.

FIG. 11 is a block diagram showing the configuration of the apparatus for estimating error in a multi-axis controlled machine according to an exemplary embodiment of the invention. Referring to FIG. 11, the apparatus for estimating error in a multi-axis controlled machine according to an exemplary embodiment of the invention includes a machine configuration definition module 10, an error synthesis module 20, and an error mapping module 30.

The machine configuration definition module 10 defines a topology of machine, that is, the environment of the multi-axis controlled machine, which is subjected to error estimation. More specifically, the machine configuration definition module 10 serves to define the drive axes of the multi-stage controlled machine, the posture of tools, the setting of squareness error, offset distances between axes, and the like.

The error synthesis module 20 defines geometric errors appropriate to the machine configuration of the multi-axis controlled machine and performs modeling on the parameters of error measurement data. In this fashion, the error synthesis module 20 generates a final error synthesis model by applying the generalized error synthesis model, as expressed in Formula 14, to the structure of the multi-axis controlled machine, which is subjected to error estimation.

The error mapping module 30 creates a virtual coordinate, which includes error of a designated shape or position, using the error synthesis model defined by the error synthesis module 20 and generates an error map, which visually expresses the error.

Accordingly, the user can predict and estimate the final error, which occurs from the multi-axis controlled machine, using the error map generated by the error mapping module 30 and compensate for the error using the result of the error estimation.

The detailed operations and functions of the individual modules can be understood more fully with reference to the error estimation method, which is described hereinafter.

Figure 12:
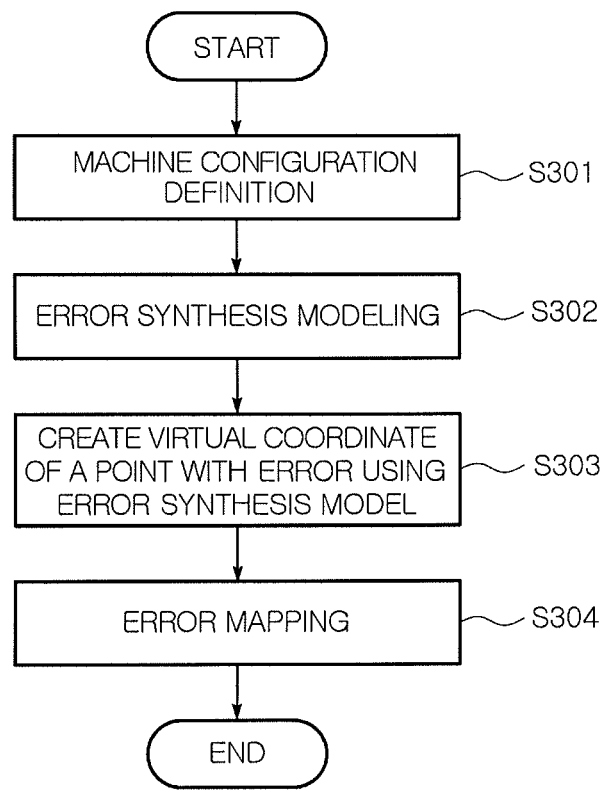
FIG. 12 is a flowchart showing the entire process of the method for estimating error in a multi-axis controlled machine according to an exemplary embodiment of the invention.

FIG. 12 is a flowchart showing the method for estimating error in a multi-axis controlled machine according to an exemplary embodiment of the invention.

Referring to FIG. 12, the method for estimating error in a multi-axis controlled machine according to an exemplary embodiment of the invention includes processes of machine configuration definition S301, error synthesis modeling S302, production of imaginary points including error S303, and error mapping S304.

The machine configuration definition process S301 is a process that is executed by the machine configuration definition module 10 shown in 11. The machine configuration definition process S301 defines the structure of the multi-axis controlled machine in order to generate an error synthesis model of the same machine. Specifically, the machine configuration definition process S301 defines drive axes of the multi-axis controlled machine, the posture of a tool, offset distances between the drive axes, the setting of squareness error, and the like. The definition of the drive axes of the multi-axis controlled machine is set by sequentially arranging the axes, which are formed between the reference coordinate system {R} and the workpiece coordinate system {P} and between the reference coordinate system {R} and the tool coordinate system {T}, and can be expressed by the form of {p, . . . , r, . . . , t}. Here, P indicates a workpiece, r indicates the reference coordinate system, and t indicates the tool. The drive axes formed between the workpiece and the tool can be defined by sequentially inserting the drive axes, which are formed between the reference coordinate system and the workpiece, in between p and r and the drive axes, which are formed between the reference coordinate system and the tool, in between r and t. For example, in the case of the five-axis machine tool shown in FIG. 5, the axes are constructed in the order of: "reference coordinate system→Y axis→A axis→C axis→workpiece" and "reference coordinate system→X axis→Z axis→tool." Thus, the definition of the drive axes is {p, c, a, y, r, x, z, t}. In addition, the definition of the posture of the tool represents the orientation consistent with the posture of the tool 2 and is expressed by one selected from among x, y, and z orientations. In the case of the five-axis machine tool shown in FIG. 5, the posture of the tool is expressed by one selected from among x, y, and z orientations. In addition, the definition of the offset distances between the drive axes is to set the distance values between the drive axes, which are set at the time of designing or manufacturing, and the offset errors, which are obtained by measurement, by dividing the distance values and the offset errors in x, y, and z orientations. This process can be facilitated by user input. In this process, tool offset can also be considered in the input.

In addition, the machine configuration definition process S301 serves to define a reference axis and a sub-reference axis for squareness error. In the case of the machine tool, this process is executed as described above with respect to the squareness parameter when corresponding axes of the three linear axes y, y, and z are input respectively.

The machine configuration definition process S301 as described above can be executed when the user sequentially inputs the drive axes, tool posture, and offset distance through input windows, which occur sequentially.

After the structure of the multi-axis controlled machine is defined, the process of error synthesis modeling S302 is performed on the multi-axis controlled machine by applying the above-defined mechanistic structure and the error measurement data to the generalized error synthesis model, which is calculated by the above-described technology.

The process of error synthesis modeling S302 is executed by the error synthesis module 20. This process applies the generalized error synthesis model, as in Formula 14 above, to the multi-axis controlled machine by defining the parameters according to the multi-axis shape, which is based on the configuration of the multi-axis controlled machine as defined above, and performing parametric modeling on the error measurement data, which is measured by an error measurement device or the like.

Figure 13:
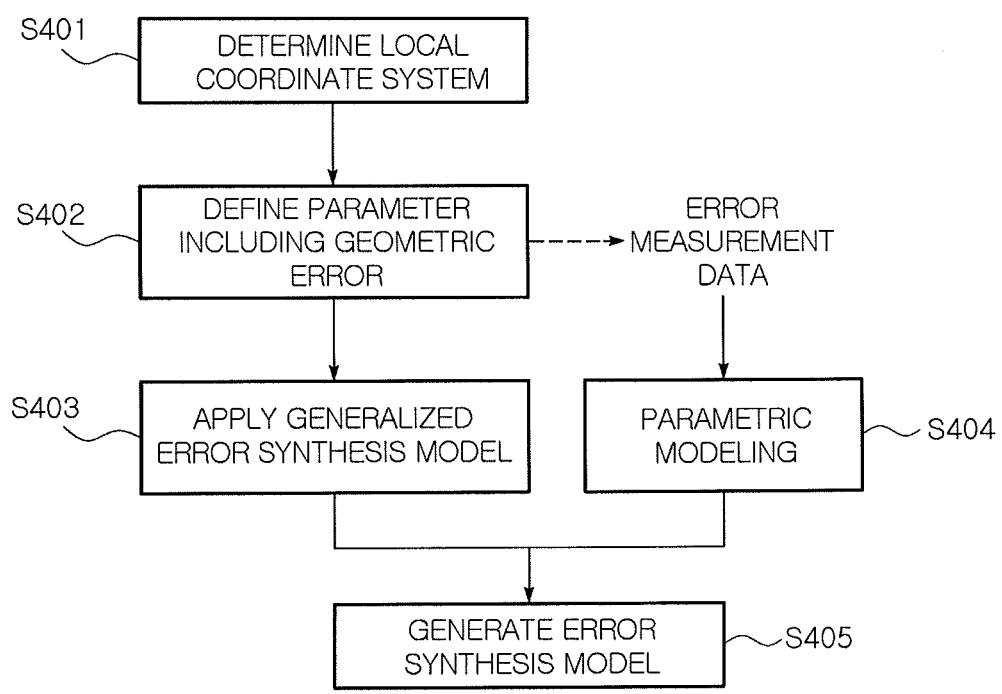
FIG. 13 is a flow diagram showing error synthesis modeling in detail according to an exemplary embodiment of the invention.

FIG. 13 is a flow diagram showing error synthesis modeling in detail according to an exemplary embodiment of the invention.

With reference to FIG. 13, the process of error synthesis modeling 302 is described in more detail. The process of error synthesis modeling 302 includes steps S401 and S402 in order to generate the error synthesis model. In S401, local coordinate systems of respective links of the corresponding multi-axis controlled machine are defined with reference to the mechanistic in the foregoing process S301, and in S402, parameters corresponding to the values of drive axes, the relationships of the drive axes, and geometric errors are defined based on the local coordinate systems. The errors defined herein are the same as in Table 1 above.

Afterwards, the process of error synthesis modeling 302 calculates, in S403, sub-matrices and vectors by applying the above-defined parameters to the generalized error synthesis model as in Formula 14 above in order to generate the final error synthesis model. In the five-axis machine tool, the result of this calculation is, for example, the same as the result in Formula 15 above.

Afterwards, in S404, the measurement data of the errors are input sequentially through the input windows. In this case, individual distance errors and error measurement values are measured as error values of target distances and angles and are managed according to error types, error orientations, and drive axes. For example, the individual distance errors and the individual angular errors are measured according to the drive axes and are divided in x, y, and z orientations when they are presented. Here, a specific type of error in one orientation of one drive axis is composed in one file (e.g., an Excel file) as shown in FIG. 15*a*.

In addition, in S404, parametric modeling is performed on the error measurement data. This process is enabled by performing curve fitting on measurement points, in which the user can select an object curve model from polynomial function, trigonometric function, or the like.

In addition, in S405, the final error synthesis model of the multi-axis controlled machine having the above-defined structure is generated by applying all of the errors, on which the parametric modeling was performed, to the generalized error synthesis model, which was calculated as above.

After the final error synthesis model is generated according to the shape of the multi-axis controlled machine through these processes, the process of producing imaginary points including error S303 is performed.

In the process of producing imaginary points including error S303, when any shape to be processed (i.e., a processing shape) for error estimation of the multi-axis controlled machine is set and ideal points on a route of any processing shape are generated, imaginary points including errors are produced with respect to individual routes using the generalized error synthesis model. Afterwards, the process of error mapping S304 generates an error map, by which the error can be estimated, by connecting the above-produced imaginary points. In the error mapping, an ideal shape, which does not include the error, is also presented so that the state of the geometric error and the performance of the machine can be easily estimated.

Figure 14:
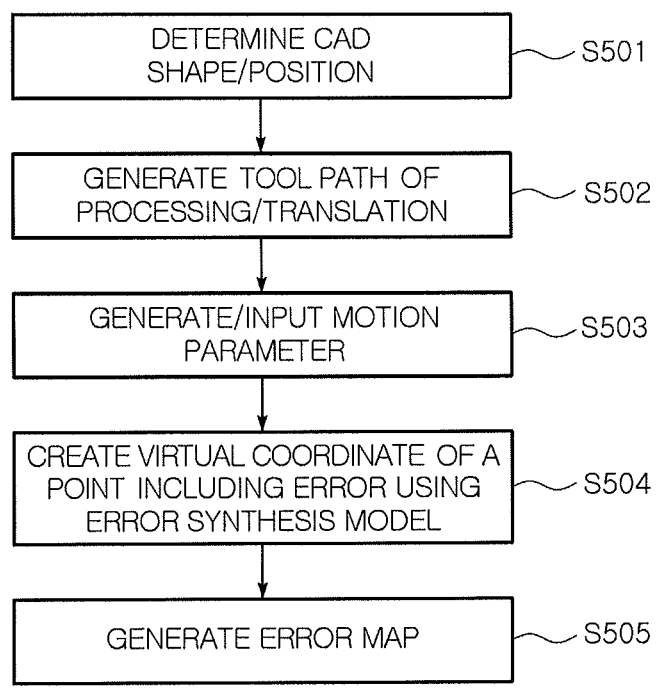
FIG. 14 is a flow diagram showing error mapping in detail according to an exemplary embodiment of the invention.

FIG. 14 is a flow diagram showing the error mapping in detail according to an exemplary embodiment of the invention.

Referring to FIG. 14, in the process of producing imaginary points including error S303, a CAD shape to be estimated is designated or directly input by the user.

Next, tool path coordinates of individual drive axes have to be generated according to the above-described shape. In the case of a machine tool, these processes can be obtained using CAM software, and inverse kinematics calculation is applied in the case of a five-axis machine tool. According to an exemplary embodiment of the invention, this process basically provides the step of processing a variety of shapes, such as a hemisphere or a frustum of a cone according to the international standard SNA979, in S501 and the step of generating tool path of translation in S502. In S503, this process also produces coordinates of processing tool path for other shapes by inputting motion parameters.

For example, as shown in FIG. 1, in the case of the five-axis machine tool having x, y, z, a, and c axes, coordinate values for the five axes are input. Here, units are given as options for individual drive axes and the user is allowed to select a unit that he/she intends. In the case where error information, which occurs in the processing of a certain shape, is intended, listed coordinates presenting a designated processing shape are input. The input can be formed as selecting a file in which listed coordinates of the machine are input (e.g., an Excel file). The file is composed with reference to a data structure. If the listed coordinates of the machine are input, the coordinates of individual axes are diagramed according to the numbers of the coordinate so that the user can inspect the continuity of the drive axes or the like.

As described above, the motion parameters of the multi-axis controlled machine are defined in S503. Next, this process produces, in S504, imaginary points including error of individual points in the path by applying the input coordinates of the machine to the error synthesis model defined for the multi-axis controlled machine, the error synthesis model produced in the process of error synthesis modeling S302.

This process generates, in S505, an error map for the purpose of comparison by shaping imaginary points including the produced errors. Here, since an error vector has a very small value when compared to a shape coordinate, the user is allowed to select an error rate to visualize the error map so that the error can be weighted or not. For example, if the error rate is 1, the error is not weighted. IF the error rate is greater than 1, the error is weighted in proportion to the error rate.

Figure 16:
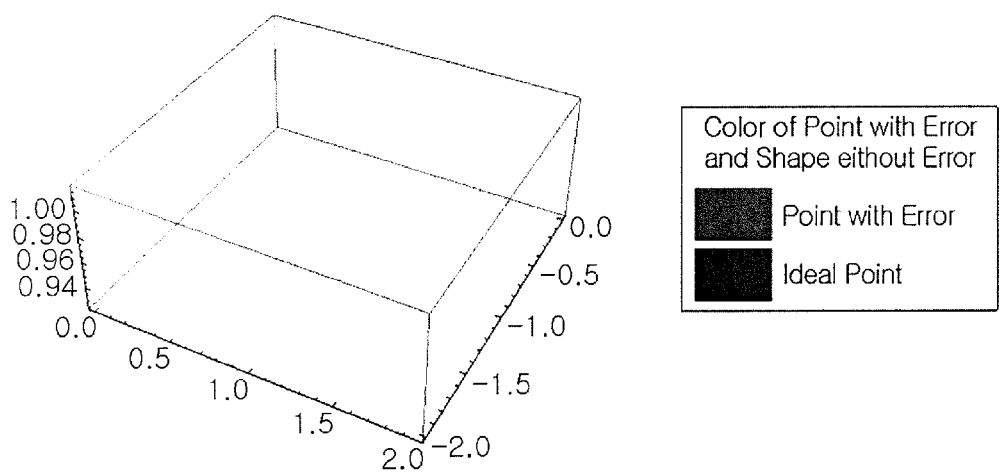
FIG. 16 is a diagram showing an example of an error map generated with respect to one machine coordinate according to an exemplary embodiment of the invention.

Meanwhile, if error information for one coordinate of the machine is requested rather than that for a route including a plurality of positions, the processing shape is not designated but one coordinate for the machine is allowed to be input. In this case, the error map is expressed as shown in FIG. 16 so that ideal points of the machine are compared with imaginary points including error. In this error map, the distances between the ideal points of the machine and the imaginary points including error can be obtained.

Figure 17A:
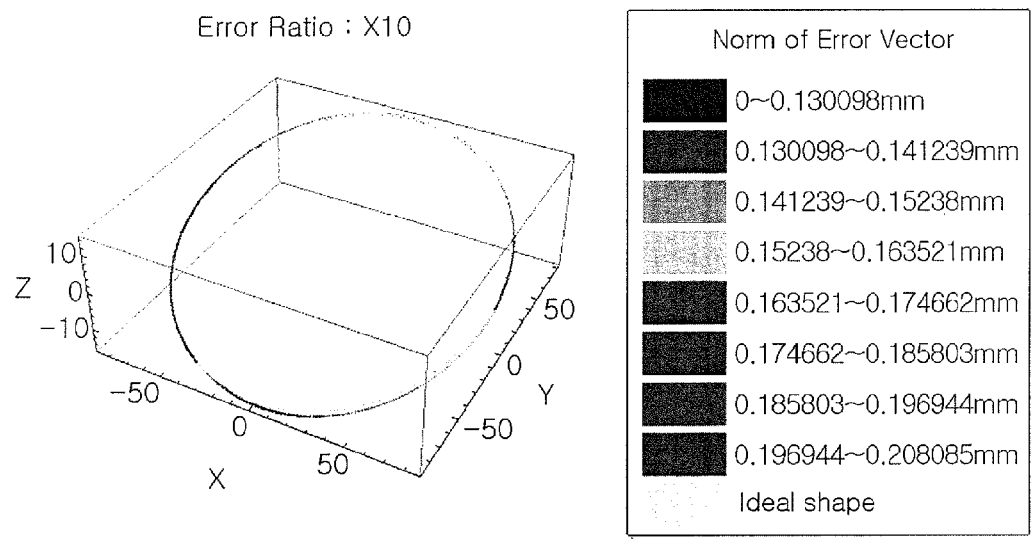
FIGS. 17 to 19 are diagrams showing examples of error maps generated with respect to a plurality of machine coordinates according to an exemplary embodiment of the invention.
Figure 17B:
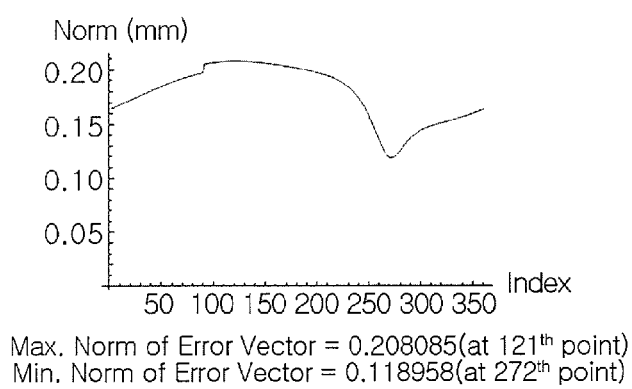

When the listed coordinates of the machine are selected, the error map is expressed as in FIG. 17($a$), thereby making it possible to enable visual error estimation across the entire coordinates. In addition, as shown in FIG. 17($b$), error values are listed according to the numbers of coordinates so that the degrees of the errors according to the coordinates can be produced.

In addition, it is possible to designate a certain processing shape and to estimate error occurring when a workpiece is processed in this shape. This is shown, by way of example, in FIGS. 18 and 19.

Figure 18:
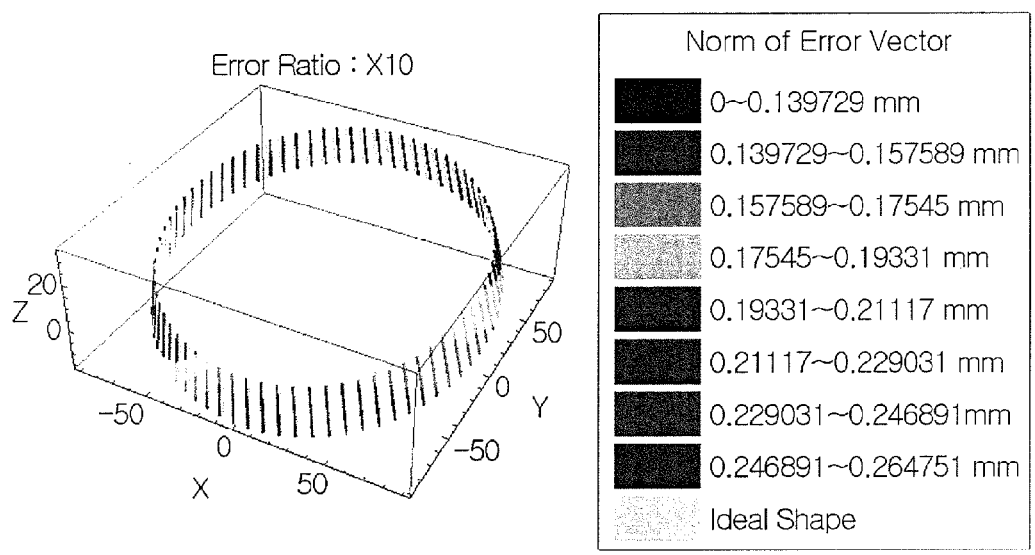

FIG. 18 is a diagram showing an example of an error map, which shows error distribution occurring when a workpiece is processed in the form of a frustum of a cone according to NAS 979. As shown in the figure, errors are shown according to the coordinates of the frustum of a cone.

Figure 19:
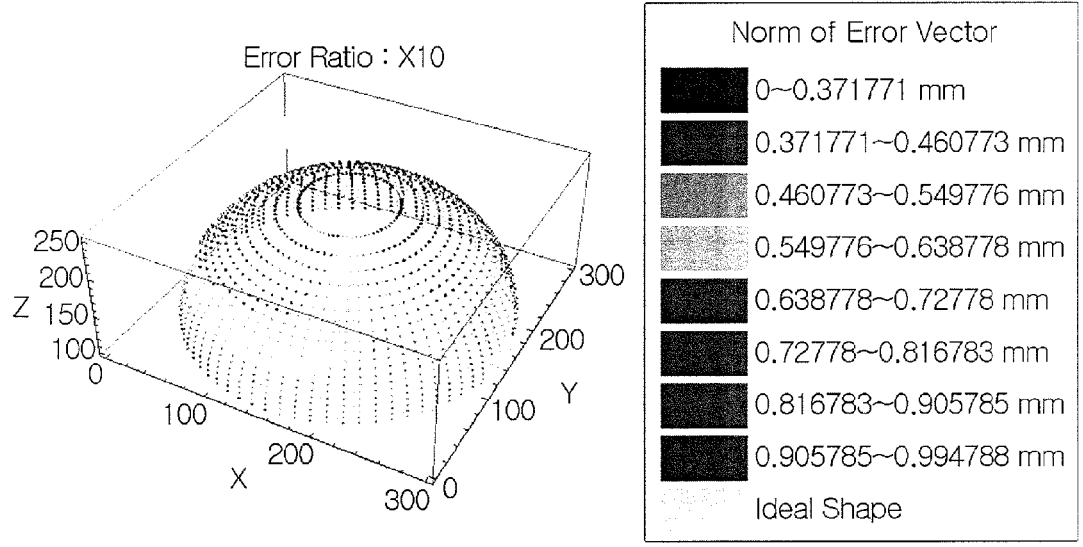

FIG. 19 is a diagram showing an error map when a workpiece is processed in the form of a hemisphere. In this figure, errors are shown according to the coordinates of the processing tool path of the hemispherical shape.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for estimating error in a multi-axis controlled machine comprising:
    defining the structure of the multi-axis controlled machine subjected to error estimation;
    determining local coordinate systems for each link of the multi-axis controlled machine;
    defining parameters, which represent behaviors of drive axes having geometric error and relationships between the drive axes according to the defined structure of the multi-axis controlled machine;
    adding the defined parameters by applying the parameters to a generalized error synthesis model;
    performing parametric modeling on error measurement data, which are measured from the multi-axis controlled machine;

generating an error synthesis model of the multi-axis controlled machine by applying the result of parametric modeling in response to the result of the adding;

wherein the generalized error synthesis model is consisting of:

kinematic modeling of drive axes, which include kinematic error models of linear and rotary axes;

modeling one or more drive axes by arranging the drive axes in forward or backward direction with respect to a reference coordinate system; and omitting higher order terms of errors from the kinematic error modeling, which includes arranging the drive axes; and wherein the generalized error synthesis model is expressed by formulas:

$$\tau_{N_I}^{N_F} = (\tau_0^{N_I})^{-1} \tau_0^{N_F} = \begin{bmatrix} \text{Rotation} & | & \text{Translation} \\ 0\ 0\ 0 & | & 1 \end{bmatrix}$$

Rotation =

$$\left(\prod_{i=1}^{N_I} A_i\right)^T \prod_{i=1}^{N_F} A_i + \sum_{i=1}^{N_F}\left(\prod_{j=i}^{N_I} A_j\right)^T \prod_{j=0}^{i-1} A_j(S_i + E_i)\prod_{j=i}^{N_F} A_j -$$

$$\sum_{i=1}^{N_I}\left(\prod_{j=i}^{N_I} A_j\right)^T (S_i+E_i)\left(\prod_{j=o}^{i-1} A_j\right)^T \prod_{j=1}^{N_F} A_j$$

Translation = -

$$\sum_{i=1}^{N_I}\left(\sum_{j=i}^{N_I} A_j\right)^T (o_i + t_i + d_i) + \sum_{i=2}^{N_I}\left(\prod_{j=i}^{N_I} A_j\right)^T S_i \sum_{j=1}^{i-1}\left(\prod_{k=j}^{i-1} A_k\right)^T t_j +$$

$$\sum_{i=1}^{N_I}\left(\sum_{j=i}^{N_I} A_j\right)^T E_i \sum_{j=1}^{i}\left(\prod_{k=j}^{i-1} A_k\right)^T t_j + \sum_{i=1}^{N_I}\left(\sum_{j=i}^{N_I} A_j\right)^T (S_i+E_i)\sum_{j=1}^{i}\left(\prod_{k=j}^{i-1} A_k\right)^T o_j +$$

$$\sum_{i=1}^{N_F}\left(\prod_{j=i}^{N_I} A_j\right)^T \prod_{j=0}^{i-1} A_j(o_i+t_i+d_i) + \sum_{i=1}^{N_I}\left(\prod_{j=i}^{N_I} A_j\right)^T \prod_{j=0}^{i-1} A_j S_i \sum_{j=i\ k=i-1}^{N_F j-1} A_k t_j +$$

$$\sum_{i=1}^{N_F-1}\left(\prod_{j=i}^{N_I} A_j\right)^T \prod_{j=0}^{i-1} A_j E_i \sum_{j=i+1}^{N_F} \prod_{j=i}^{j-1} A_k t_j +$$

$$\sum_{i=1}^{N_F-1}\left(\prod_{j=i}^{N_I} A_j\right)^T \prod_{j=0}^{i-1} A_j(S_i+E_i)\sum_{j=i+1}^{N_F} \prod_{k=i}^{j-1} A_k o_j -$$

$$\left(\sum_{i=1}^{N_I}\left(\prod_{j=i}^{N_I} A_i\right)^T (S_i+E_i)\left(\prod_{j=0}^{i-1} A_j\right)^T\right)\left(\sum_{i=1}^{N_F} \prod_{i=0}^{i-1} A_j(o_i+t_i)\right)$$

where $\tau_i^j$ is a transform matrix from {j} coordinate system to coordinate system, $N_F$: number of drive axes connected in forward direction in reference coordinate system $N_I$: number of drive axes connected in backward direction in reference coordinate system $o_i$: 3×1 vector representing offset between drive axes $S_i$: 3×3 skew matrix representing squareness between drive axes $t_i$: 3×1 vector representing translation input value of linear slide $A_i$: 3×3 rotation conversion matrix representing rotation input values of rotary table $d_i$: 3×1 vector representing position error at point of input value of drive axis $E_i$: 3×3 skew matrix representing angular error at a point of input value of drive axis T: Transpose of a matrix $$\sum_{i=m}^{n} x_i = x_m + x_{m+1} + \ldots + x_{n-1} + x_n:$$

summation operator of adding a sequence of terms $$\prod_{i=m}^{n} x_i = x_m x_{m+1} \ldots x_{n-1} x_n:$$

product operator of multiplying a sequence of terms i, j, k: dummy variables as the indices of summation operator or product operator.

2. The method according to claim 1, wherein defining the structure of the multi-axis controlled machine defines selecting one or more axis from the group consisting of the drive axes of the multi-axis controlled machine, a posture of a tool, offset distances between the drive axes, and a setting of squareness error.

3. The method according to claim 2, wherein defining the drive axes of the multi-axis controlled machine comprises sequentially arranging the drive axes, which are oriented in backward and forward directions in a reference coordinate system of the multi-axis controlled machine.

4. The method according to claim 1, further comprising:
creating a virtual coordinate, which includes error of a designated shape to be processed or at a position to be confirmed, using the error synthesis model; and
generating an error map, which visually expresses the created imaginary point.

5. The method according to claim 4, wherein creating a virtual coordinate comprises:
determining the designated shape to be processed or the position to be confirmed;
generating a processing route of the multi-axis controlled machine for the designated shape to be processed or the position to be confirmed;
generating or inputting a motion parameter about each of the drive axes of the multi-axis controlled machine along the route processing of the multi-axis controlled machine; and
creating a virtual coordinate having error for each of points of the processing route using the error synthesis model.

6. The method according to claim 4, wherein the designated shape to be processed is a frustum of a cone or a hemisphere.

7. An apparatus for estimating error in a multi-axis controlled machine, comprising:
a machine configuration definition module for defining a topology of a machine subjected to error estimation;
an error synthesis module for defining parameters, which represent behaviors of drive axes having geometric error and relationships between the drive axes according to the defined structure of the multi-axis controlled machine, adding the defined parameters by applying the parameters to a generalized error synthesis model, and generating an error synthesis model of the multi-axis controlled machine by applying a result of parametric modeling in response to a result of the adding; and
an error mapping module for creating a virtual coordinate, which includes error of a designated shape to be processed or at a position to be confirmed, using the error synthesis model, and generating an error map, which visually expresses the produced imaginary point;

wherein the generalized error synthesis model is derived by selecting one or more from the group consisting of:

kinematic modeling of drive axes, which include kinematic error models of linear and rotary axes;

modeling one or more drive axes by arranging the drive axes in forward or backward direction with respect to a reference coordinate system; and omitting higher order terms of errors from the kinematic error modeling, which includes arranging the drive axes; and wherein the generalized error synthesis model is expressed by formulas:

$$\tau^{N_F}_{N_I} = (\tau^{N_I}_0)^{-1} = \tau^{N_F}_0 = \left[\begin{array}{c|c} \text{Rotation} & \text{Translation} \\ \hline 0\ 0\ 0 & 1 \end{array}\right]$$

Rotation =

$$\left(\prod_{i=1}^{N_I} A_i\right)^T \prod_{i=1}^{N_F} A_i + \sum_{i=1}^{N_F}\left(\prod_{j=i}^{N_I} A_j\right)^T \prod_{j=o}^{i-1} A_j(S_i + E_i) \prod_{j=i}^{N_F} A_j -$$

$$\sum_{i=1}^{N_I}\left(\prod_{j=i}^{N_I} A_j\right)^T (S_i + E_i) \left(\prod_{j=o}^{i-1} A_j\right)^T \prod_{j=1}^{N_F} A_j$$

Translation = -

$$\sum_{i=1}^{N_I}\left(\sum_{j=i}^{N_I} A_j\right)^T (o_i + t_i + d_i) + \sum_{i=2}^{N_I}\left(\prod_{j=i}^{N_I} A_j\right)^T S_i \sum_{j=1}^{i-1}\left(\prod_{k=j}^{i-1} A_k\right)^T t_j +$$

$$\sum_{i=1}^{N_I}\left(\sum_{j=i}^{N_I} A_j\right)^T E_i \sum_{j=1}^{i}\left(\prod_{k=j}^{i-1} A_k\right)^T t_j + \sum_{i=1}^{N_I}\left(\sum_{j=i}^{N_I} A_j\right)^T (S_i + E_i) \sum_{j=1}^{i}\left(\prod_{k=j}^{i-1} A_k\right)^T o_j +$$

$$\sum_{i=1}^{N_F}\left(\prod_{j=i}^{N_I} A_j\right)^T \prod_{j=0}^{i-1} A_j (o_i + t_i + d_i) + \sum_{i=1}^{N_I}\left(\prod_{j=i}^{N_I} A_j\right)^T \prod_{j=0}^{i-1} A_j S_i \sum_{j=i}^{N_F-1} \prod_{k=i-1} A_k t_j +$$

$$\sum_{i=1}^{N_F-1}\left(\prod_{j=i}^{N_I} A_j\right)^T \prod_{j=0}^{i-1} A_j E_i \sum_{j=i+1}^{N_F j-1} \prod A_k t_j +$$

$$\sum_{i=1}^{N_F-1}\left(\prod_{j=1}^{N_I} A_j\right)^T \prod_{j=0}^{i-1} A_j (S_i + E_i) \sum_{j=i+1}^{N_F} \prod_{k=i}^{j-1} A_k o_j -$$

$$\left(\sum_{i=1}^{N_I}\left(\prod_{j=i}^{N_I} A_i\right)^T (S_i + E_i) \left(\prod_{j=0}^{i-1} A_j\right)^T\right)\left(\sum_{i=1}^{N_F} \prod_{j=0}^{i-1} A_j(o_i + t_i)\right)$$

where $\tau_i^j$ is a transform matrix from {j} coordinate system to {i} coordinate system, $N_F$: number of drive axes connected in forward direction in reference coordinate system $N_I$: number of drive axes connected in backward direction in reference coordinate system $o_i$: 3×1 vector representing offset between drive axes $S_i$: 3×3 skew matrix representing squareness between drive axes $t_i$: 3×1 vector representing translation input value of linear slide $A_i$: 3×3 rotation conversion matrix representing rotation input values of rotary table $d_i$: 3×1 vector representing position error at point of input value of drive axis $E_i$: 3×3 skew matrix representing angular error at a point of input value of drive axis T: Transpose of a matrix $$\sum_{i=m}^{n} x_i = x_m + x_{m+1} + \ldots + x_{n-1} + x_n:$$

summation operator of adding a sequence of terms $$\prod_{i=m}^{n} x_i = x_m x_{m+1} \ldots x_{n-1} x_n:$$

product operator of multiplying a sequence of terms i, j, k: dummy variables as the indices of summation operator or product operator.

8. The apparatus according to claim 7, wherein the mechanistic structure definition module defines one or more axis selected from the group consisting of the drive axes of the multi-axis controlled machine, a posture of a tool, a setting of squareness, and offset distances between the drive axes error.

9. The apparatus according to claim 8, wherein the machine configuration definition module defines the drive axes of the multi-axis controlled machine by sequentially arranging the drive axes, which are oriented in backward and forward directions in a reference coordinate system of the multi-axis controlled machine.

10. The apparatus according to claim 7, wherein the designated shape to be processed is a frustum of a cone or a hemisphere.

11. The apparatus of claim 7, wherein the generalized error synthesis model is derived by:

kinematic modeling of drive axes, which include kinematic error models of linear and rotary axes;

modeling one or more drive axes by arranging the drive axes in forward or backward direction with respect to a reference coordinate system; and omitting higher order terms of errors from the kinematic error modeling, which includes arranging the drive axes.

* * * * *

UNITED STATES PATENT AND TRADEMARK OFFICE
CERTIFICATE OF CORRECTION

PATENT NO.        : 8,700,369 B2                                              Page 1 of 1
APPLICATION NO.   : 12/769178
DATED             : April 15, 2014
INVENTOR(S)       : Seung-Han Yang et al.

It is certified that error appears in the above-identified patent and that said Letters Patent is hereby corrected as shown below:

In the Claims

Column 23, line 52, claim 1 reads "to coordinate system," and should correct to read
-- to {i} coordinate system, --.

Signed and Sealed this
Twelfth Day of August, 2014

Michelle K. Lee
*Deputy Director of the United States Patent and Trademark Office*